(12) United States Patent
Kim et al.

(10) Patent No.: US 12,430,885 B2
(45) Date of Patent: Sep. 30, 2025

(54) ARTIFICIAL INTELLIGENCE APPARATUS AND METHOD FOR DETECTING UNSEEN CLASS ITEMS THEREOF

(71) Applicant: LG ELECTRONICS INC., Seoul (KR)

(72) Inventors: Hyoeun Kim, Seoul (KR); Kamin Lee, Seoul (KR); Seungah Chae, Seoul (KR); Heeyeon Choi, Seoul (KR); Yeonjee Jung, Seoul (KR); Hyejeong Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 449 days.

(21) Appl. No.: 18/045,448

(22) Filed: Oct. 10, 2022

(65) Prior Publication Data

US 2023/0140893 A1 May 11, 2023

Related U.S. Application Data

(60) Provisional application No. 63/278,113, filed on Nov. 11, 2021.

(30) Foreign Application Priority Data

Jul. 25, 2022 (KR) .......................... 10-2022-0091679

(51) Int. Cl.
*G06V 10/00* (2022.01)
*G06T 3/40* (2006.01)
(Continued)

(52) U.S. Cl.
CPC .............. *G06V 10/764* (2022.01); *G06T 3/40* (2013.01); *G06T 9/00* (2013.01)

(58) Field of Classification Search
CPC .... G06V 10/764; G06V 10/82; G06V 10/454; G06V 10/7753; G06N 3/08; G06N 3/02;
(Continued)

(56) References Cited

U.S. PATENT DOCUMENTS 5,751,856 A 5/1998 Hirabayashi
6,151,414 A * 11/2000 Lee .......................... G06T 9/008
382/253
(Continued)

FOREIGN PATENT DOCUMENTS

EP 0388043 9/1990
EP 3907655 11/2021
WO 2021188104 9/2021

OTHER PUBLICATIONS

PCT International Application No. PCT/KR2022/014027, Written Opinion of the International Searching Authority dated Dec. 27, 2022, 8 pages.

*Primary Examiner* — Amir Alavi
(74) *Attorney, Agent, or Firm* — LEE, HONG, DEGERMAN, KANG & WAIMEY

(57) ABSTRACT

The present disclosure relates to an artificial intelligence apparatus capable of classifying and detecting an item of an unseen class having high visual similarity to an item of a seen class that has been learned and known in advance, and a method for detecting an unseen class items thereof, and when the item image is input, generate encoded data by encoding the item image, generate decoded data by decoding the encoded data using a codebook of a plurality of codebooks in which encoded data for each item class is stored, corresponding to a pre-learned item class, and detect the unknown item by classifying the class of the item image based on the generated decoded data.

13 Claims, 25 Drawing Sheets

(51) Int. Cl.
  *G06T 9/00* (2006.01)
  *G06V 10/764* (2022.01)
(58) Field of Classification Search
  CPC ........ G06N 3/082; G06N 3/092; G06N 3/042;
    G06N 3/045; G06N 3/047; G06N 3/0454;
    G06N 3/0475; G06N 3/0464; G06T 9/00;
    G06T 3/40
  See application file for complete search history.

(56) References Cited

U.S. PATENT DOCUMENTS

| | | | | |
|---|---|---|---|---|
| 7,212,973 | B2 * | 5/2007 | Toyama | H03M 7/30 |
| | | | | 704/E19.01 |
| 10,484,149 | B2 * | 11/2019 | Guan | H04L 1/1829 |
| 10,810,543 | B2 * | 10/2020 | Hsieh | G06Q 30/0627 |
| 11,113,532 | B2 * | 9/2021 | Kim | G06N 3/045 |
| 11,132,607 | B1 | 9/2021 | Kim et al. | |
| 11,200,467 | B2 * | 12/2021 | Lee | G06N 3/08 |
| 11,263,744 | B2 * | 3/2022 | Yoo | G06T 7/0012 |
| 11,681,610 | B2 * | 6/2023 | Chang | G06F 11/3688 |
| | | | | 714/26 |
| 11,822,579 | B2 * | 11/2023 | Mizutani | H03M 7/30 |
| 12,074,895 | B1 * | 8/2024 | Shen | H04L 63/101 |
| 2010/0303343 | A1 | 12/2010 | Lee et al. | |
| 2022/0050828 | A1 * | 2/2022 | Wu | H04L 41/042 |
| 2023/0140893 | A1 * | 5/2023 | Kim | G06T 9/00 |
| | | | | 382/224 |

* cited by examiner

| ID | OOD | FPR at TPR = 95%(%,↓) | | | | | AUROC(%,↑) | | | | |
|---|---|---|---|---|---|---|---|---|---|---|---|
| | | MD | SSD+ | RMD | RMD +SupCon | Our Pro1 | MD | SSD+ | RMD | RMD +SupCon | Our Pro1 |
| CIFAR100 ID (40) | CIFAR100 OOD (60) | 81.40 | 80.15 | 79.50 | 80.07 | 78.91 | 78.55 | 78.03 | 79.96 | 78.81 | 80.04 |

(b)

| ID | OOD | FPR at TPR = 95%(%,↓) | | | | | AUROC(%,↑) | | | | |
|---|---|---|---|---|---|---|---|---|---|---|---|
| | | MD | SSD+ | RMD | RMD +SupCon | Our Pro1 | MD | SSD+ | RMD | RMD +SupCon | Our Pro1 |
| Pet IN (18) | Pet OOD (19) | 89.99 | 88.67 | 85.11 | 78.39 | 52.17 | 69.74 | 68.68 | 78.68 | 80.69 | 84.02 |

(c)

| ID | OOD | FPR at TPR = 95%(%,↓) | | | | AUROC(%,↑) | | | |
|---|---|---|---|---|---|---|---|---|---|
| | | MD | SSD+ | RMD | Our Pro1 | MD | SSD+ | RMD | Our Pro1 |
| Oxford 102 Flower IN (51) | Oxford 102 Flower ODD (51) | 40.71 | 74.55 | 43.77 | 45.80 | 93.49 | 88.87 | 93.10 | 93.65 |

FIG. 20

| ID | OOD | AUROC(%, ↑) | | | | |
|---|---|---|---|---|---|---|
| | | MSP | MD | RMD | SSD+ | Our Pro2 |
| CIFAR100 (60) | CIFAR100 (40) | 61.57 | 61.45 | 61.99 | 49.68 | 95.61 |

FIG. 25
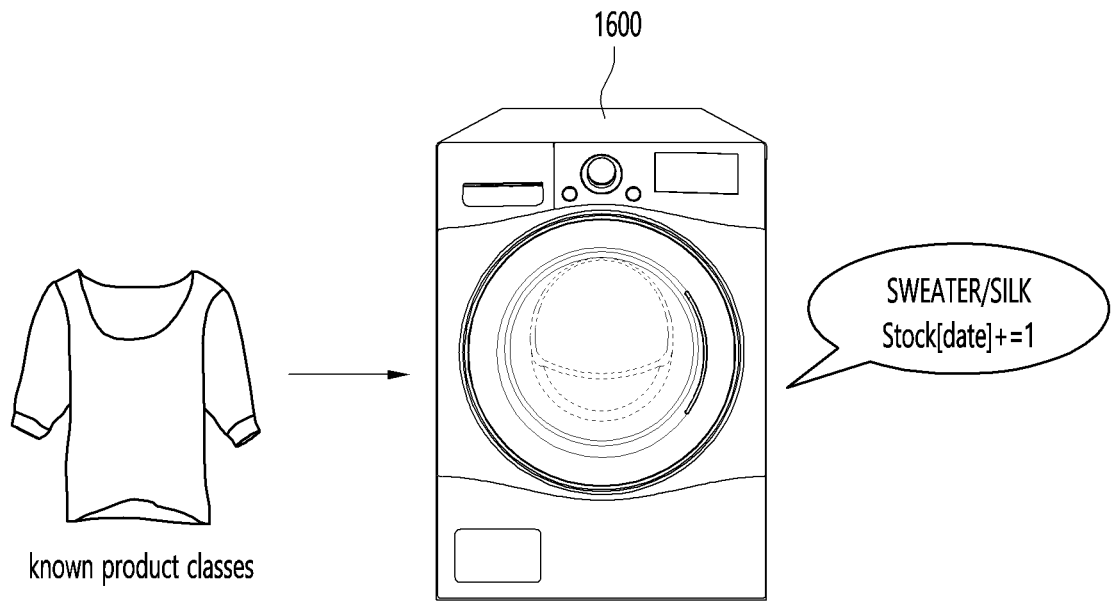
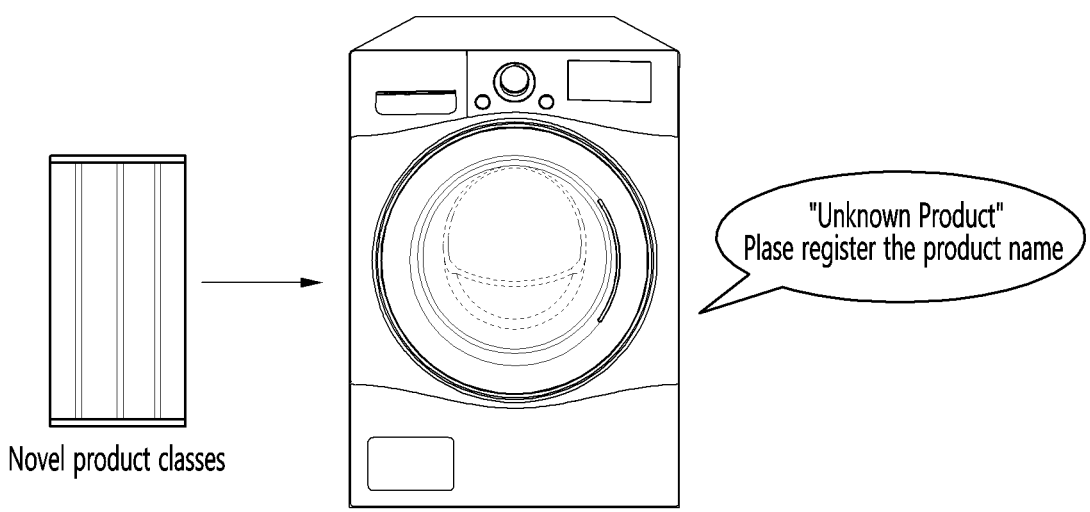

ARTIFICIAL INTELLIGENCE APPARATUS AND METHOD FOR DETECTING UNSEEN CLASS ITEMS THEREOF

CROSS-REFERENCE TO RELATED APPLICATION(S)

Pursuant to 35 U.S.C. § 119, this application claims the benefit of earlier filing date and right of priority to Korean Application No. 10-2022-0091679, filed on Jul. 25, 2022, and also claims the benefit of U.S. Provisional Application No. 63/278,113, filed on Nov. 11, 2021, the contents of which are all incorporated by reference herein in their entirety.

BACKGROUND

The present disclosure relates to an artificial intelligence apparatus capable of classifying and detecting an item of an unseen class having high visual similarity to an item of a seen class that has been pre-learned and known, and a method for detecting an unseen class items thereof.

In general, artificial intelligence is a field of computer engineering and information technology that studies how computers can do thinking, learning, self-development, or the like that can be done by human intelligence and means allowing computers to mimic the intelligent behavior of humans.

In addition, artificial intelligence does not exist by itself, but has many direct and indirect connections with other fields of computer science. In particular, in modern times, attempts are being very actively made to introduce artificial intelligence elements in various fields of information technology and use them to solve problems in that field.

Meanwhile, technologies for recognizing and learning surrounding situations, providing information desired by a user in a desired form, or performing an operation or function desired by a user, using artificial intelligence are being actively studied.

In addition, an electronic device that provides such various operations and functions may be called an artificial intelligence device.

Recently, home appliances such as refrigerators provide a service for notifying a user of information about stored items by identifying items stored therein through artificial intelligence technology.

If a specific item is put into the home appliance, the artificial intelligence model of the home appliance that provides such a service can detect whether the put item belongs to a seen class that has been pre-learned and thus is known or belongs to an unseen class that has not been learned and is unknown, and if the detected item is of an unseen class, can request labeling by feedback to the user, and if the detected item is of a seen class, can recognize as a pre-learned item.

However, in the existing artificial intelligence model, when the visual similarity between the unseen class item and the seen class item is high, there is a tendency to make an error of discriminating the unseen class item as the pre-learned item of the seen class and thus there is a problem in that the quality of the service provided to the customer is lowered due to the deterioration of the detection performance of the item between classes.

In addition, in the case of data noise caused by the user's tendency to use home appliances such as the speed of opening and closing the refrigerator or the influence of internal lighting, the existing artificial intelligence model lowers the detection performance with respect to the items between classes and thus there was also a problem in that the quality of the service provided to customers was lowered.

Therefore, in the future, it is necessary to develop an artificial intelligence technology that can improve the quality of services provided to customers by accurately classifying items with high similarity between classes and items having data noise.

SUMMARY

An object of the present disclosure is to solve the above problems and other problems.

An object of the present disclosure is to provide an artificial intelligence apparatus that can improve the quality of services provided to customers by accurately classifying items with high similarity between classes and items having data noise by classifying the classes of items using a codebook for each pre-learned item class, and a method for detecting an unseen class item thereof.

An artificial intelligence apparatus according to an embodiment of the present disclosure may include a memory configured to store item images; and a processor configured to detect an unknown item by classifying the class of the item image, in which the processor may be configured to, when the item image is input, generate encoded data by encoding the item image, generate decoded data by decoding the encoded data using a codebook of a plurality of codebooks in which encoded data for each item class is stored, corresponding to a pre-learned item class, and detect the unknown item by classifying the class of the item image based on the generated decoded data.

A method for detecting unseen class item of an artificial intelligence apparatus according to an embodiment of the present disclosure may include receiving item image; classifying the class of the item image using a pre-learned codebook for each item class; and detecting a unknown item based on the class of the classified item image, in which the classifying the class of the item image may include encoding the item image to generate encoded data; generating decoded data by decoding the encoded data using a codebook of a plurality of codebooks in which the encoded data for each item class is stored, corresponding to a pre-learned item class; and classifying the class of the item image based on the generated decoded data.

According to an embodiment of the present disclosure, an artificial intelligence apparatus classifies a class of an item using a pre-learned codebook for each item class to accurately classify items having a high similarity between classes and items having data noise and thus improves the quality of services provided to the customer.

BRIEF DESCRIPTION OF THE DRAWINGS

FIG. 19 is a chart illustrating an unseen class detection performance result for a first model of an artificial intelligence apparatus according to an embodiment of the present disclosure.

FIG. 20 is a diagram illustrating an unseen class detection performance result for a second model of an artificial intelligence apparatus according to an embodiment of the present disclosure.

FIG. 25 is a view illustrating a washing machine to which an artificial intelligence apparatus is applied according to an embodiment of the present disclosure.

DETAILED DESCRIPTION OF THE EMBODIMENTS

Figure 1:
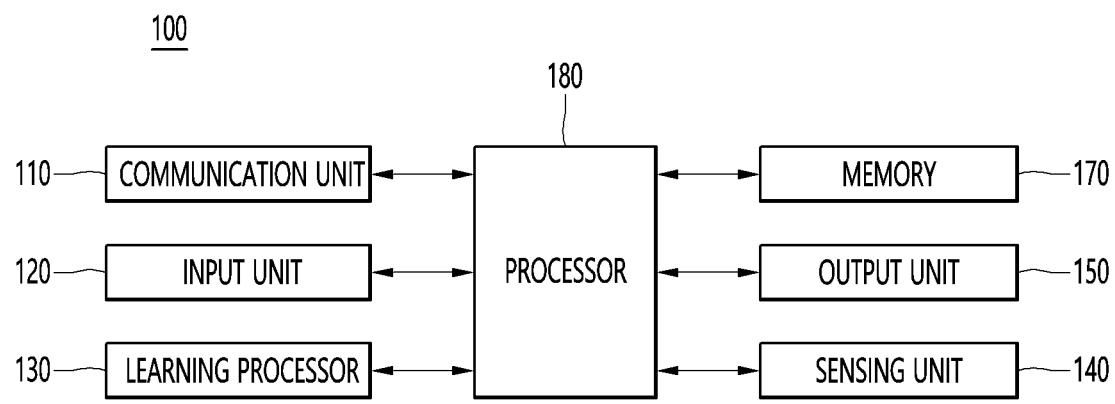
FIG. 1 illustrates an artificial intelligence apparatus according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI device 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
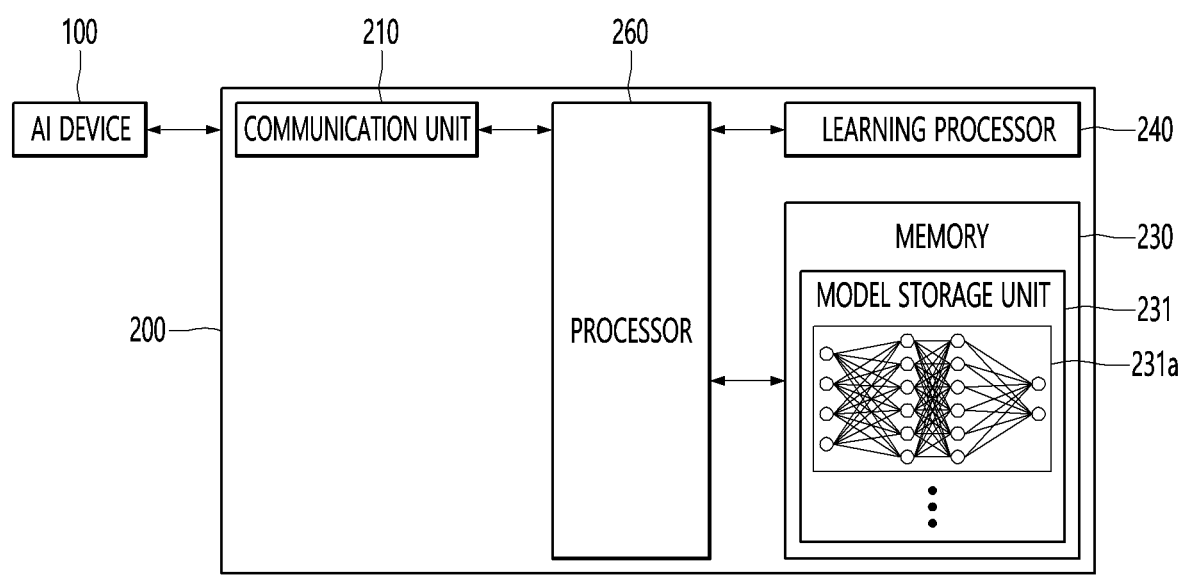
FIG. 2 illustrates an artificial intelligence server according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
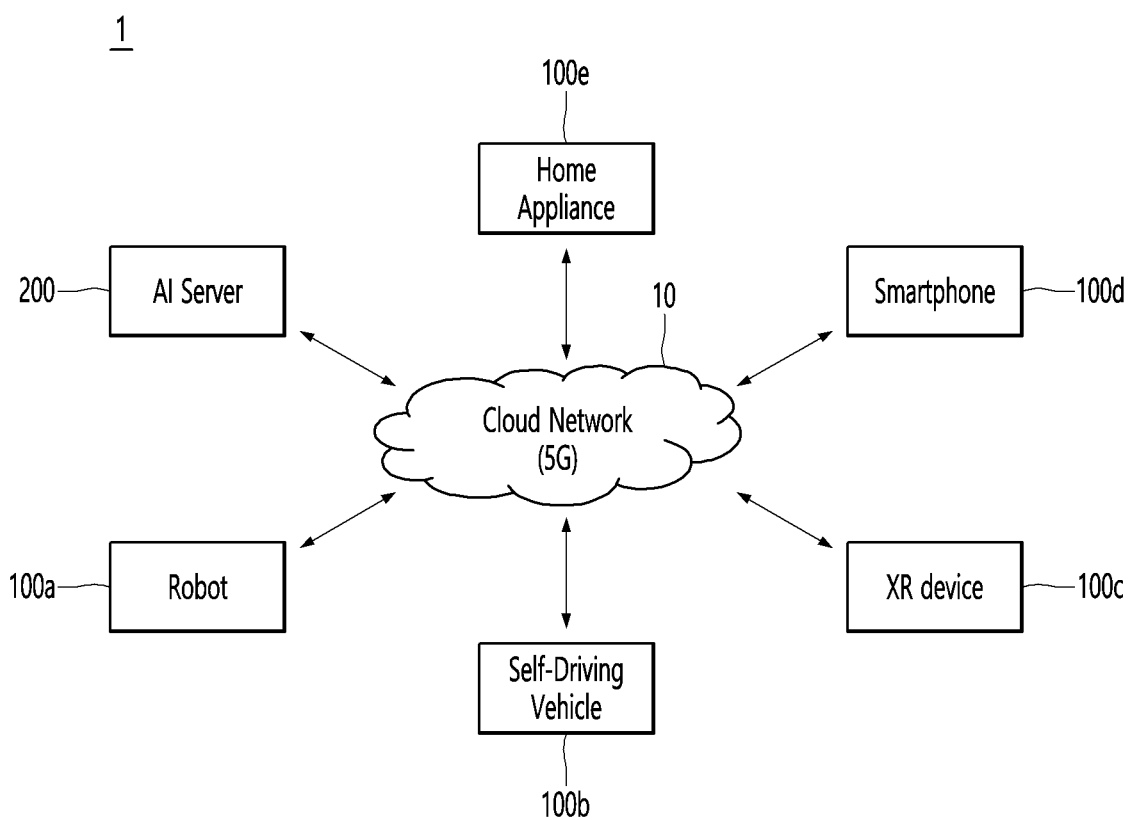
FIG. 3 illustrates an artificial intelligence system according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
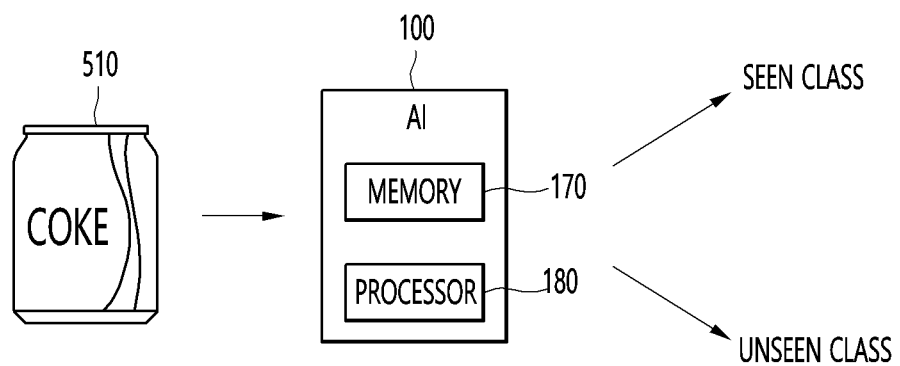
FIG. 4 is a diagram for explaining an operation of an artificial intelligence apparatus according to an embodiment of the present disclosure.

FIG. 4 is a diagram for explaining an operation of an artificial intelligence apparatus according to an embodiment of the present disclosure.

As illustrated in FIG. 4, the artificial intelligence apparatus 100 of the present disclosure may include a memory 170 for storing an item image 510 and a processor 180 for classifying a class of the item image 510 to detect unknown item.

Here, when the item image 510 is input, the processor 180 encodes the item image to generate encoded data, and uses a codebook of a plurality of codebooks in which encoded data for each item class is stored, corresponding to a pre-learned item class to decode the encoded data, generates the decoded data, classifies a class of item image based on the generated decoding data to detect the known item of the seen class or the unknown item of the unseen class.

As an embodiment, the processor 180 may include a plurality of encoders for encoding the item image 510 to output encoded data, a plurality of codebooks in which encoded data for each item class is stored, a plurality of decoders that decode the encoded data based on the encoded data stored in the codebook of the plurality of codebooks corresponding to a pre-learned item class and output the decoded data, and a detector that classifies the class of the item image 510 based on the outputted decoded data to detect a unknown item.

Here, the encoder may include a first encoder for downsizing the item image to a first size to output first encoded data, and a second encoder for downsizing the first encoded data to a second size to output second encoded data and the decoder may include a first decoder for upsizing the second encoded data to a second size based on the encoded data of the first codebook corresponding to the pre-learned item class to output the first decoded data; and a second decoder for up sizing the first decoded data and the first encoded data to a first size based on the encoded data of the second codebook corresponding to the pre-learned item class to output second decoded data.

In addition, the codebook of each item class may constitute, as a set to which discrete data is mapped, an embedding space of a specified size and may include a bottom-level codebook corresponding to the first encoded data and a top-level codebook corresponding to the second encoded data.

Here, the first encoder may replace the first encoded data with an index of a code latent vector of code latent vectors in the bottom-level codebook, having a minimum distance, and the second encoder may replace the second encoded data with an index of code latent vector of code latent vectors in the top-level codebook, having a minimum distance.

In addition, the first decoder may map the index of the code latent vector corresponding to the second encoded data to the code latent vector of the top-level codebook, respectively, and the second decoder may map the index of the code latent vector corresponding to the first encoded data to the code latent vector of the bottom-level codebook.

Here, the index of the code latent vector may correspond to a partial image for each portion of the inputted item image.

In addition, the encoder and the decoder may have the same number of each other so as to correspond to one-to-one correspondence.

Here, the number of encoders and decoders may be determined in proportion to the number of layered characteristic levels.

The layered characteristic level may include a characteristic for downsizing the item image to a predetermined size.

In addition, the number of layered characteristic levels may be determined by the number of downsizing of the item image for each predetermined size.

In addition, the number of codebooks may be determined in proportion to the number of item classes.

Here, the number of codebooks may be greater than the number of item classes.

In other words, the number of codebooks may include a plurality of codebooks for each item class, and the plurality of codebooks included in each item class may include layered codebooks for each characteristic level.

For example, the layered codebook for each characteristic level may include a bottom-level codebook corresponding to the first encoded data and a top-level codebook corresponding to the second encoded data.

In addition, the number of codebooks for each layered characteristic level may be determined in proportion to the number of encoders and decoders.

Here, the number of codebooks for each layered characteristic level may be the same as the number of encoders or the number of decoders.

In addition, the codebook for each layered characteristic level may be learned according to the layered characteristic level so that local detailed information and global information of an item image are separated.

In some cases, the encoder may include a first encoder for downsizing the item image to a first size to output first encoded data, a second encoder for downsizing the first encoded data to a second size to output second encoded data, and a third encoder for downsizing the second encoded data to a third size to output third encoded data, and the decoder may include a first decoder for upsizing the third encoded data to the third size based on the encoded data of the first codebook corresponding to the pre-learned item class to output first decoded data, a second decoder for upsizing the first decoded data and the second encoded data to a second size based on the encoded data of the second codebook corresponding to the pre-learned item class to output the second decoded data, and a third decoder for upsizing the second decoded data and the first encoded data to a first size based on the encoded data of the third codebook corresponding to the pre-learned item class to output the third decoded data.

Here, the codebook of each item class may constitute, as a set to which discrete data is mapped, an embedding space of a specified size and may include a bottom-level codebook corresponding to the first encoded data, a middle-level codebook corresponding to the a second encoded data, and a top-level codebook corresponding to the third encoded data.

In this case, the first encoder may replace the first encoded data with an index of a code latent vector of code latent vectors in the bottom-level codebook, having a minimum distance, the second encoder may replace the second encoded data with an index of a code latent vector of code latent vectors in the middle-level codebook, having a minimum distance, and the third encoder may replace the third encoded data with an index of a code latent vector of code latent vectors in the top-level codebook, having a minimum distance.

In addition, the first decoder may map the index of the code latent vector corresponding to the third encoded data to the code latent vector of the top-level codebook, respectively, and the second decoder may map the index of the code latent vector corresponding to the second encoded data to the code latent vector of the middle-level codebook, respectively, and the third decoder may map the index of the code latent vector corresponding to the first encoded data to the code latent vector of the bottom-level codebook, respectively.

In addition, the processor 180 may learn a plurality of codebooks so that encoded data for each item class is stored based on a training dataset including item image data and the corresponding item class label data, construct the item image using the codebook for each item class, and perform learning for classifying the class of the reconstructed item image.

Here, when learning a plurality of codebooks, the processor 180 may learn all of the codebooks for each layered characteristic level included in the codebook of each item class.

For example, the layered codebook for each characteristic level includes a bottom-level codebook corresponding to the first encoded data and a top-level codebook corresponding to the second encoded data, or may include a bottom-level codebook corresponding to the first encoded data, a middle-level codebook corresponding to the second encoded data, and a top-level codebook corresponding to the third encoded data.

For example, the item class label data may include shark, trout, flatfish, rose, sunflower, tulip, or the like, but this is only an example and is not limited thereto.

As another embodiment, the processor 180 may include a classifier for classifying an item image into a pre-learned superclass when an item image is input, an encoder that encodes an item image of the classified superclass and outputs encoded data, a plurality of codebooks in which encoded data is stored for each subclass of the superclass, a decoder for decoding the encoded data based on the encoded data of the plurality of codebooks stored in the codebook corresponding to the pre-learned subclass to output the decoded data, and a detector for classifying a class of an item image based on the output decoded data to detect an unknown item.

Here, the classifier may perform learning to classify a superclass of an item image based on a training dataset including item image data and the corresponding superclass label data.

In this case, the classifier may classify the item image into a superclass having a larger category than a category corresponding to the subclass.

For example, the super class label data may include fish, flowers, or the like, but this is only an example and is not limited thereto.

In addition, the codebook may constitute, as a set to which discrete data is mapped, an embedding space of a specified size, and may include a plurality of subclass codebooks corresponding to each superclass.

Then, the encoder may replace the encoded data with an index of a code latent vector of code latent vectors in a subclass codebook corresponding to the superclass of the item image, having a minimum distance.

Then, the decoder may map the index of the code latent vector corresponding to the encoded data to the code latent vector of the subclass codebook corresponding to the superclass of the item image, respectively.

Here, the index of the code latent vector may correspond to a partial image for each portion of the inputted item image.

Next, the number of codebooks may be determined in proportion to the number of superclasses.

As an example, the number of codebooks may be greater than the number of superclasses.

The codebook may include a plurality of codebooks for each superclass, and the plurality of codebooks included in each superclass may include codebooks for each subclass having a smaller category than that of the superclass.

In addition, the processor 180 may learn the plurality of codebooks so that the encoded data for each subclass of each superclass based on a training dataset including the item image data, the corresponding superclass label data, and subclass label data, reconstruct an item image using a codebook for each subclass, and perform learning to classify a class of a reconstructed item image.

Here, when learning a plurality of codebooks, the processor 180 may learn all codebooks for each subclass included in each superclass.

In this case, the superclass label data may include label data having a larger category than the category corresponding to the subclass label data.

As an example, superclass label data may include fish, flowers, or the like, and subclass label data may include shark, trout, flatfish, rose, sunflower, tulip, or the like, but this is only an example and is not limited thereto.

As such, as a first embodiment, when learning a codebook corresponding to each item class, the processor 180 can learn the codebooks for each layered characteristic level included in each item class according to the layered characteristic level so that the local detailed information and global information of the item image are separated and thus can accurately classify items with high similarity between classes.

In addition, as a second embodiment, the processor 180 learns a classifier to classify a superclass of an item image and learns codebooks for each subclass included in each superclass, so that items with high similarity between classes are accurately classified.

For example, if the item image is food, the processor 180 may classify the class of food by using a pre-learned codebook for each food class to detect the unknown food, and output the detection result to the refrigerator.

As another example, if the item image is clothing, the processor 180 may classify the class of clothing by using a pre-learned codebook for each clothing class to detect unknown clothing, and output the detection result to the clothing manager.

As another example, if the item image is laundry, the processor 180 may classify laundry classes using a pre-learned codebook for each laundry class to detect unknown laundry, and output the detection result to the washing machine.

As such, the artificial intelligence apparatus of the present disclosure may classify the class of the item using a pre-learned codebook for each item class to accurately classify items with high similarity between classes and items having data noise, and thus the quality of the service provided to the customer can be improved.

Figure 5:
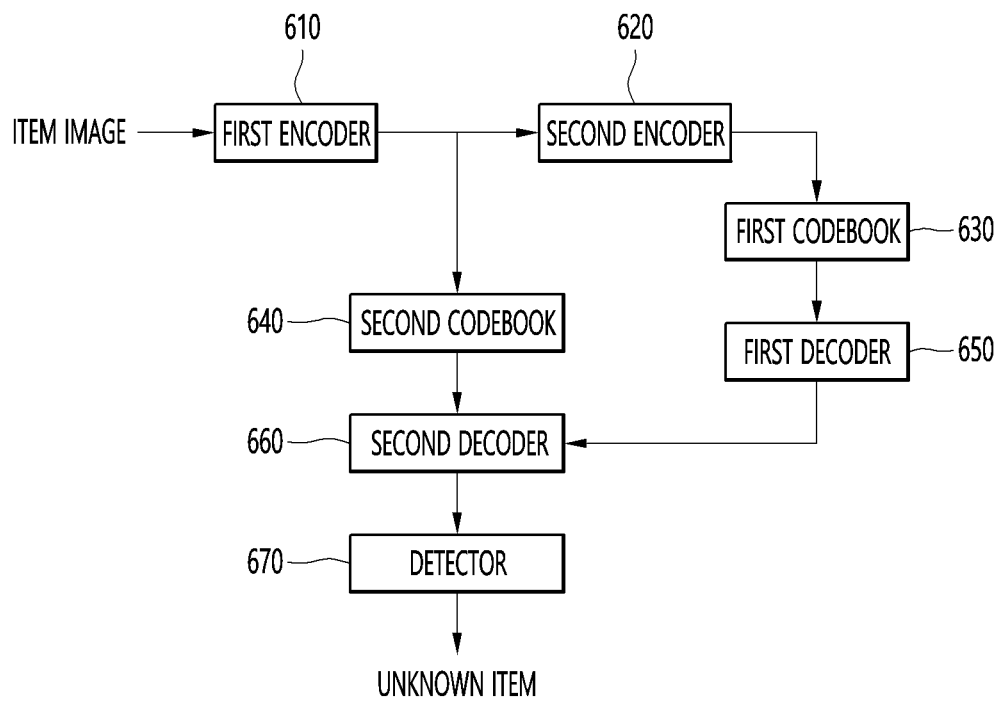
FIG. 5 is a diagram for explaining a processor of an artificial intelligence apparatus according to an embodiment of the present disclosure.

FIG. 5 is a diagram for explaining a processor of an artificial intelligence apparatus according to an embodiment of the present disclosure.

As illustrated in FIG. 5, the processor of the present disclosure may classify an unseen class item by inputting the item image into the pre-learned artificial intelligence model.

Here, the artificial intelligence model is an improved Vector Quantized Variational AutoEncoder (VQ-VAE) model, and may perform item image data learning using a codebook for each item class.

The processor of the present disclosure may include a first encoder 610 for downsizing an item image to a first size to output first encoded data, a second encoder 620 for downsizing the first encoded data to a second size to output second encoded data, a first decoder 650 for upsizing the second encoded data to a second size based on the encoded data of the first codebook 630 corresponding to the pre-learned item class to output the first decoded data, a second decoder 660 for up sizing the first decoded data and the first encoded data to a first size based on the encoded data of the second codebook 640 corresponding to the pre-learned item class to output the second decoded data, and a detector 670 for classifying a class of an item image based on the second decoded data to detect a unknown item.

Here, the first and second codebooks 630 and 640 corresponding to each item class may constitute, as a set to which discrete data is mapped, an embedding space of a designated size.

For example, the second codebook 640 corresponding to each item class may include a bottom-level codebook corresponding to the first encoded data, and a first codebook 630 corresponding to each item class may include a top-level codebook corresponding to the second encoded data.

Then, the first encoder 610 may replaces the first encoded data with an index of a code latent vector of code latent vectors in the bottom-level codebook that is the second codebook 640, having the minimum distance.

Next, the second encoder 620 may replace the second encoded data with an index of a code latent vector of code latent vectors in the top-level codebook that is the first codebook 630, having the minimum distance.

Next, the first decoder 650 may map the index of the code latent vector corresponding to the second encoded data to the code latent vector of the top-level codebook which is the first codebook 630, respectively, and the second decoder 660 may map the index of the code latent vector corresponding to the first encoded data to the code latent vector of the bottom-level codebook, which is the second codebook 640, respectively.

Here, the index of the code latent vector may correspond to a partial image for each portion of the inputted item image.

In addition, the encoder and the decoder may have the same number of each other so as to correspond to one-to-one correspondence.

For example, if there are two encoders, there may be two decoders, and if there are three encoders, there may be three decoders.

In addition, the number of encoders and decoders may be determined in proportion to the number of layered characteristic levels.

Here, the layered characteristic level may include a characteristic of downsizing the item image to a predetermined size.

In other words, the number of layered characteristic levels may be determined by the number of downsizing the item image for each predetermined size.

For example, in order to classify the item image into local detailed information and global information, downsizing the item image twice can model two layered characteristic levels, and downsizing the item image three times can model three layered characteristic levels.

In addition, the number of codebooks may be determined in proportion to the number of item classes.

For example, if the number of item classes increases, the number of codebooks may also increase correspondingly.

Here, the number of codebooks may be greater than the number of item classes.

The reason is that a plurality of codebooks for each layered characteristic level are included for each item class.

In this way, the processor learns the codebooks for each layered characteristic level included in each item class according to the layered characteristic level so that the local detailed information and global information of the item image are separated, thereby accurately classifying items with high similarity between classes.

Figure 6:
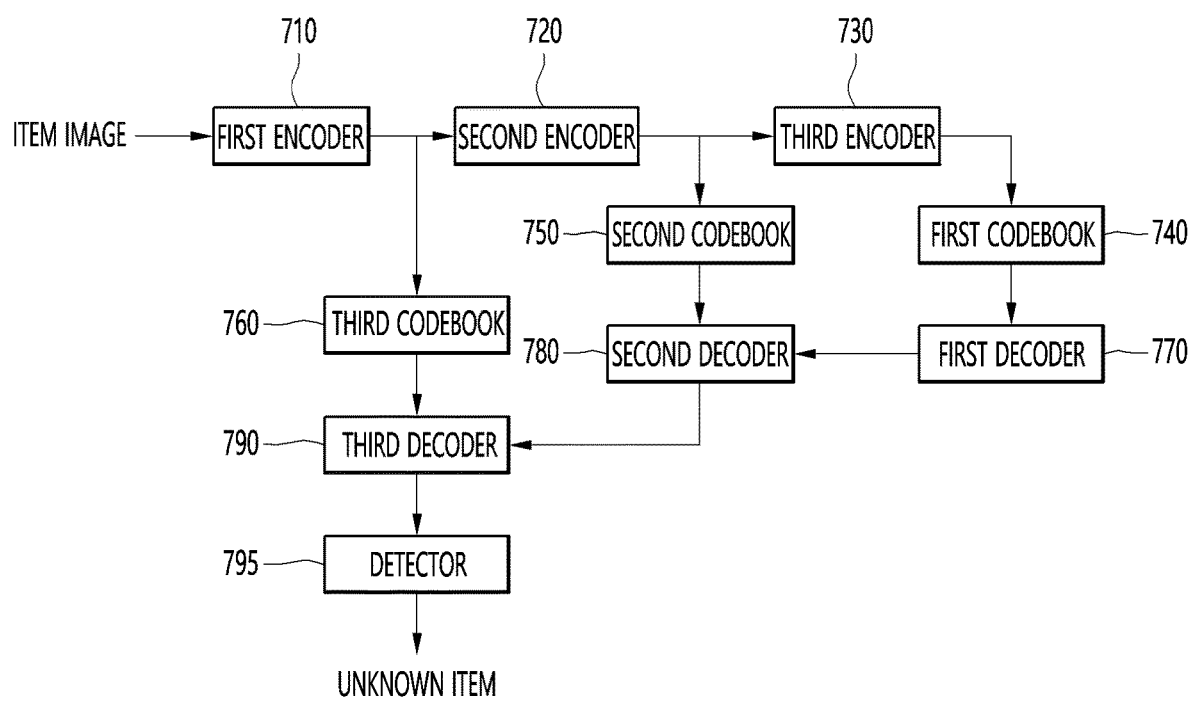
FIG. 6 is a diagram for explaining a processor of an artificial intelligence apparatus according to another embodiment of the present disclosure.

FIG. 6 is a diagram for explaining a processor of an artificial intelligence apparatus according to another embodiment of the present disclosure.

As illustrated in FIG. 6, the processor of the present disclosure is an embodiment in which the number of codebooks for each characteristic level layered for each item class is larger compared to that of the embodiment of FIG. 5.

The processor of the present disclosure may include a first encoder 710 for downsizing an item image to a first size to output first encoded data, a second encoder 720 for downsizing the first encoded data to a second size to output second encoded data, a third encoder 730 for downsizing the second encoded data to a third size to output the third encoded data, a first decoder 770 for upsizing the third encoded data to a third size based on the encoded data of the first codebook 740 corresponding to the pre-learned item class to output the first decoded data, a second decoder 780 for upsizing the first decoded data and the second encoded data to a second size based on the encoded data of the second codebook 750 corresponding to the pre-learned item class to output the second decoded data, a third decoder 790 for upsizing the second decoded data and the first encoded data to a first size based on the encoded data of the third codebook 760 corresponding to the pre-learned item class to output third decoded data, and a detector 795 for classifying a class of an item image based on the third decoded data to detect a unknown item.

Here, the first, second, and third codebooks 740, 750, and 760 of each item class may constitute, as a set to which discrete data is mapped, an embedding space of a specified size.

As an example, the third codebook 760 corresponding to each item class may include a bottom-level codebook corresponding to the first encoded data, and the second codebook 750 corresponding to each item class may include a middle-level codebook corresponding to the second encoded data, and the first codebook 740 corresponding to each item class may include a top-level codebook corresponding to the third encoded data.

In this case, the first encoder 710 may replace the first encoded data with an index of a code latent vector of code latent vectors in a bottom-level codebook which is a third codebook 760, having a minimum distance.

In addition, the second encoder 720 may replace the second encoded data with an index of a code latent vector of code latent vectors in the middle-level codebook, which is the second codebook 750, having a minimum distance.

Next, the third encoder 730 may replace the third encoded data with an index of a code latent vector of code latent vectors in the top-level codebook which is the first codebook 740, having a minimum distance.

Next, the first decoder 770 may map the index of the code latent vector corresponding to the third encoded data to the code latent vector of the top-level codebook which is the first codebook 740, respectively, and the second decoder 780 may map the index of the code latent vector corresponding to the second encoded data to the code latent vector of the middle-level codebook which is the second codebook 750, respectively, and the third decoder 790 may map the index of the code latent vector corresponding to the first encoded data to the code latent vectors of the bottom-level codebook which is the third codebook 760, respectively.

In the embodiments of FIGS. 5 and 6, the processor may learn a plurality of codebooks so that encoded data for each item class is stored based on a training dataset including item image data and the corresponding item class label data, reconstruct an item image using the codebook for each item class, and perform learning to classify the class of the reconstructed item image.

Here, when learning a plurality of codebooks, the processor may learn all of the codebooks for each layered characteristic level included in the codebook of each item class.

As an example, the layered codebook for each characteristic level may include, as illustrated in FIG. 5, a bottom-level codebook corresponding to the first encoded data and a top-level codebook corresponding to the second encoded data or may include, as illustrated in FIG. 6, a bottom-level codebook corresponding to the first encoded data, a middle-level codebook corresponding to the second encoded data, and a top-level codebook corresponding to the third encoded data.

Figure 7:
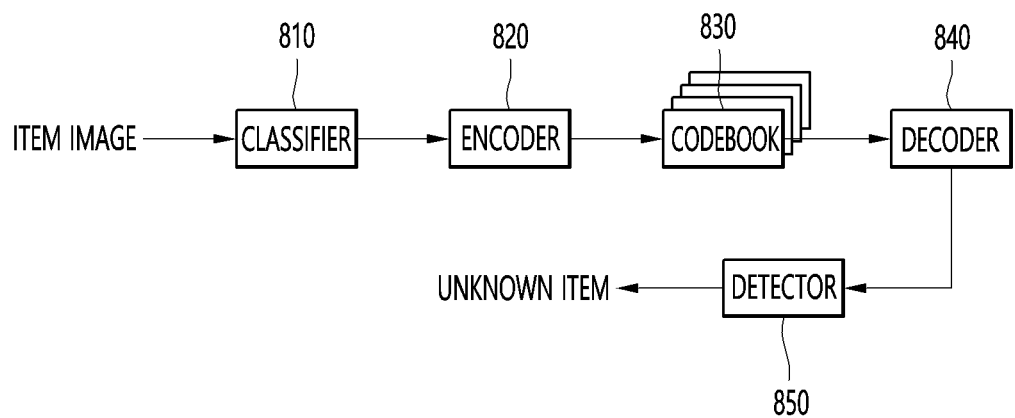
FIG. 7 is a diagram for explaining a processor of an artificial intelligence apparatus according to another embodiment of the present disclosure.

FIG. 7 is a diagram for explaining a processor of an artificial intelligence apparatus according to another embodiment of the present disclosure.

As illustrated in FIG. 7, the processor of the present disclosure may first classify an item image into a superclass, use codebooks for each subclass corresponding to the firstly classified superclass, and thus perform learning of item image data to secondarily classify the item image, compared to the embodiments of FIGS. 5 and 6.

The processor of the present disclosure may include a classifier 810 for classifying an item image into a pre-learned superclass when an item image is input, an encoder 820 for encoding an item image of the classified superclass and outputs encoded data; a plurality of codebooks 830 in which encoded data is stored for each subclass of each superclass, a decoder 840 for decoding the encoded data based on encoded data stored in a codebook 830 corresponding to a pre-learned subclass of the plurality of codebooks 830, and a detector 850 for classifying a class of an item image based on the output decoded data to detect a unknown item.

Here, the classifier 810 may perform learning to classify a superclass of an item image based on a training dataset including item image data and the corresponding superclass label data.

In this case, the classifier 810 may classify the item image into a superclass having a larger category than a category corresponding to the subclass.

For example, the super class label data may include fish, flowers, or the like, but this is only an example and is not limited thereto.

In addition, the codebook 830 may constitute, as a set to which discrete data is mapped, an embedding space of a specified size, and may include a plurality of subclass codebooks corresponding to each superclass.

Then, the encoder 820 may replace the encoded data with an index of a code latent vector of code latent vectors in a subclass codebook corresponding to the superclass of the item image, having a minimum distance.

Then, the decoder 830 may map the index of the code latent vector corresponding to the encoded data to the code latent vector of the subclass codebook corresponding to the superclass of the item image, respectively.

Here, the index of the code latent vector may correspond to a partial image for each portion of the inputted item image.

Next, the number of codebooks may be determined in proportion to the number of superclasses.

As an example, the number of codebooks may be greater than the number of superclasses.

The reason is that codebooks for each subclass having a smaller category than that of the superclass are included in each superclass.

In addition, the processor may learn a plurality of codebooks 830 so that encoded data for each subclass of each superclass is stored based on a training dataset including item image data, the corresponding superclass label data, and subclass label data, reconstruct an item image using the codebook for each subclass, and perform learning to classify the class of the reconstructed item image.

Here, when learning the plurality of codebooks 830, the processor may learn all codebooks for each subclass included in each superclass.

In this case, the superclass label data may include label data having a larger category than the category corresponding to the subclass label data.

As an example, superclass label data may include fish, flowers, or the like, and subclass label data may include shark, trout, flatfish, rose, sunflower, tulip, or the like, but this is only an example and is not limited thereto.

In this way, the processor may learn the classifier to classify the superclass of the item image and learn codebooks for each subclass included in each superclass, thereby accurately classifying items having a high similarity between classes.

Figure 8:
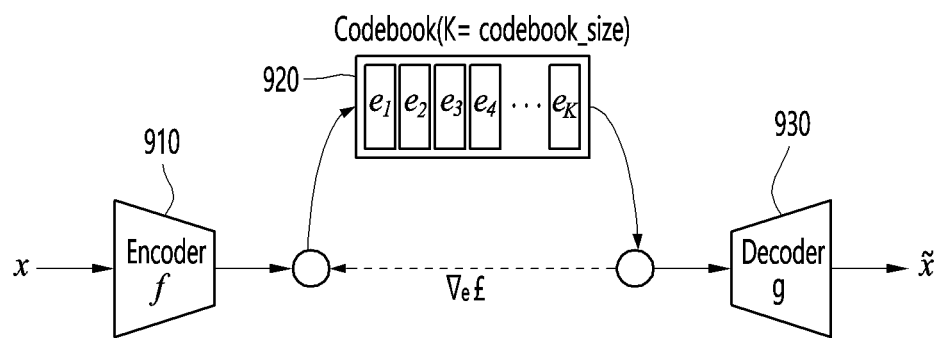
FIG. 8 is a diagram illustrating a basic model for explaining an artificial intelligence apparatus according to an embodiment of the present disclosure.

FIG. 8 is a diagram illustrating a basic model for explaining an artificial intelligence apparatus according to an embodiment of the present disclosure.

As illustrated in FIG. 8, the artificial intelligence apparatus of the present disclosure can, as an improved model based on a Vector Quantized Variational AutoEncoder (VQ-VAE) model, perform item image data learning using a codebook 920 for each item class.

The artificial intelligence apparatus of the present disclosure may include an auto-encoder that arranges and disposes data on the latent space according to a predefined distribution.

As an example, the artificial intelligence apparatus of the present disclosure may arrange and dispose data according to a normalized Gaussian distribution.

In other words, the artificial intelligence apparatus of the present disclosure may include an auto-encoder that can arrange and dispose learning data having similar characteristics in the latent space so that the learning data is not scattered in the latent space.

The artificial intelligence apparatus of the present disclosure may include a model in which the codebook 920 is additionally disposed behind the encoder 910 and in front of the decoder 930.

Here, the codebook may be a storage of a dataset in which latent vectors z in the latent space are replaced with an actual image.

Accordingly, the artificial intelligence apparatus of the present disclosure may arrange and dispose vectors corresponding to a portion of an actual item image in the latent space for each characteristic using the codebook 920 for each item class.

The artificial intelligence apparatus of the present disclosure is a VQ-VAE-based improvement model, and by classifying the class of an item using a codebook for each pre-learned item class, items with high similarity between classes and items having data noise can be accurately classified.

Figure 9:
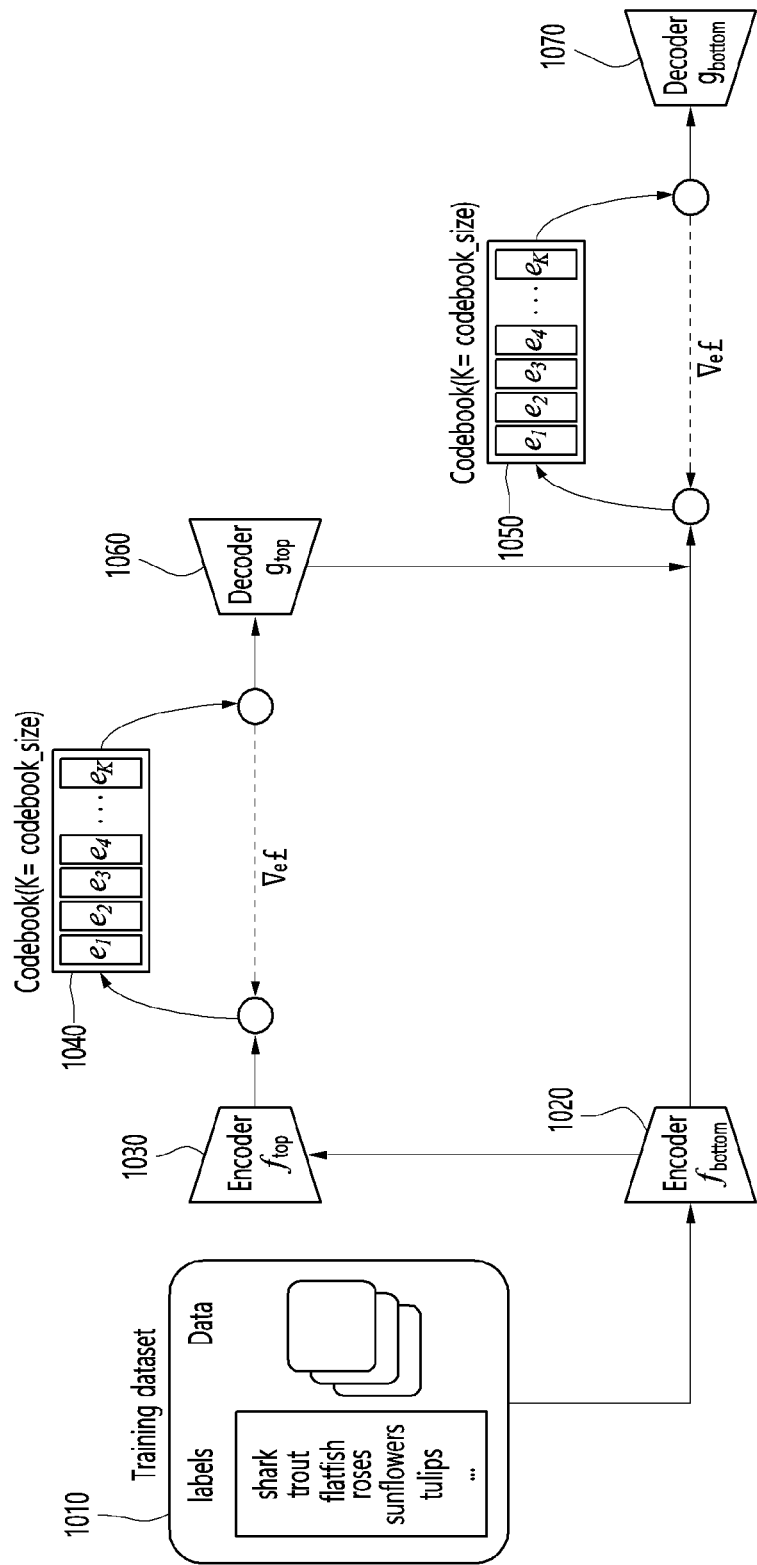
FIGS. 9 and 10 are diagrams illustrating a first model for explaining an artificial intelligence apparatus according to an embodiment of the present disclosure.
Figure 10:
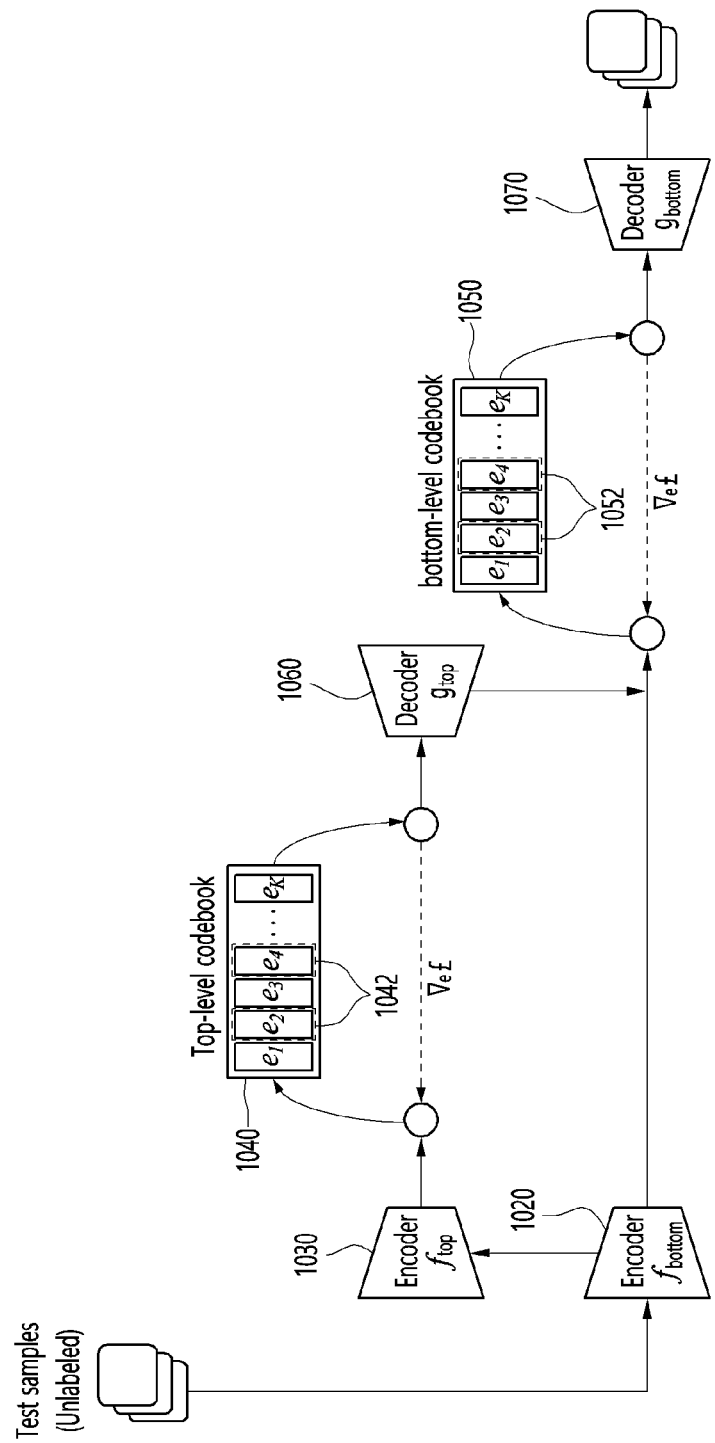

FIGS. 9 and 10 are diagrams illustrating a first model for explaining an artificial intelligence apparatus according to an embodiment of the present disclosure.

FIG. 9 is a diagram illustrating a process of learning a first model, and FIG. 10 is a diagram illustrating a process of classifying an item class using the pre-learned first model.

As illustrated in FIG. 9, according to the present disclosure, item image data learning may be performed using a codebook for each item class.

In the present disclosure, a plurality of codebooks are learned so that encoded data for each item class is stored based on a training dataset 1010 including item image data and the corresponding item class label data, and the codebook for each item class may be used to reconstruct an item image, and learning to classify the reconstructed item image may be performed.

Here, in the present disclosure, when learning a plurality of codebooks, it is possible to learn all of the codebooks for each layered characteristic level included in the codebook of each item class.

As illustrated in FIG. 9, when the training dataset 1010 including the item image data and the corresponding item class label data is input, the first encoder 1020 downsizes the item image data to a first size to store the first encoded data in the bottom-level codebook 1050.

In addition, the second encoder 1030 may downsize the first encoded data to a second size to store the second encoded data in the top-level codebook 1040.

Next, the first decoder 1060 may upsize the second encoded data stored in the top-level codebook 1040 to a second size to output the first decoded data.

Next, the second decoder 1070 may upsize the first decoded data and the first encoded data to a first size to output the second decoded data.

In addition, as illustrated in FIG. 10, the present disclosure may detect a unknown item by classifying a class of an item image using a pre-learned codebook for each item class.

In the present disclosure, when an unlabeled item image is input, encoded data is generated by encoding the item image, and a codebook corresponding to a pre-learned item class of a plurality of codebooks in which encoded data for each item class is stored is used, the encoded data may be decoded to generate the decoded data, and a class of an item image may be classified based on the generated decoded data to detect an unknown item of an unseen class.

As illustrated in FIG. 10, when an item image is input, the first encoder 1020 may downsize the item image data to a first size to output first encoded data, and the second encoder 1030 may downsize the first encoded data to the second size to output the second encoded data.

Next, the first decoder 1060 may upsize the second encoded data to a second size based on the encoded data of the top-level codebook 1040 corresponding to the pre-learned item class to output the first decoded data.

Next, the second decoder 1070 may upsize the first decoded data and the first encoded data to a first size based on the encoded data of the bottom-level codebook 1050 corresponding to the pre-learned item class to output a second decoding data.

Here, the first encoder 1020 may replace the first encoded data with an index of a code latent vector of the code latent vectors in the bottom-level codebook 1050, having a minimum distance, and the second encoder 1030 may replace the second encoded data with an index of a code latent vector of code latent vectors in the top-level codebook 1040, having a minimum distance.

Then, the first decoder 1060 may map the index of the code latent vector corresponding to the second encoded data to the code latent vector 1042 of the top-level codebook 1040, respectively, and the second decoder 1070 may map the index of the code latent vector corresponding to the first encoded data to the code latent vector 1052 of the bottom-level codebook 1050, respectively.

Here, the index of the code latent vector may correspond to a partial image for each portion of the inputted item image.

Figure 11:
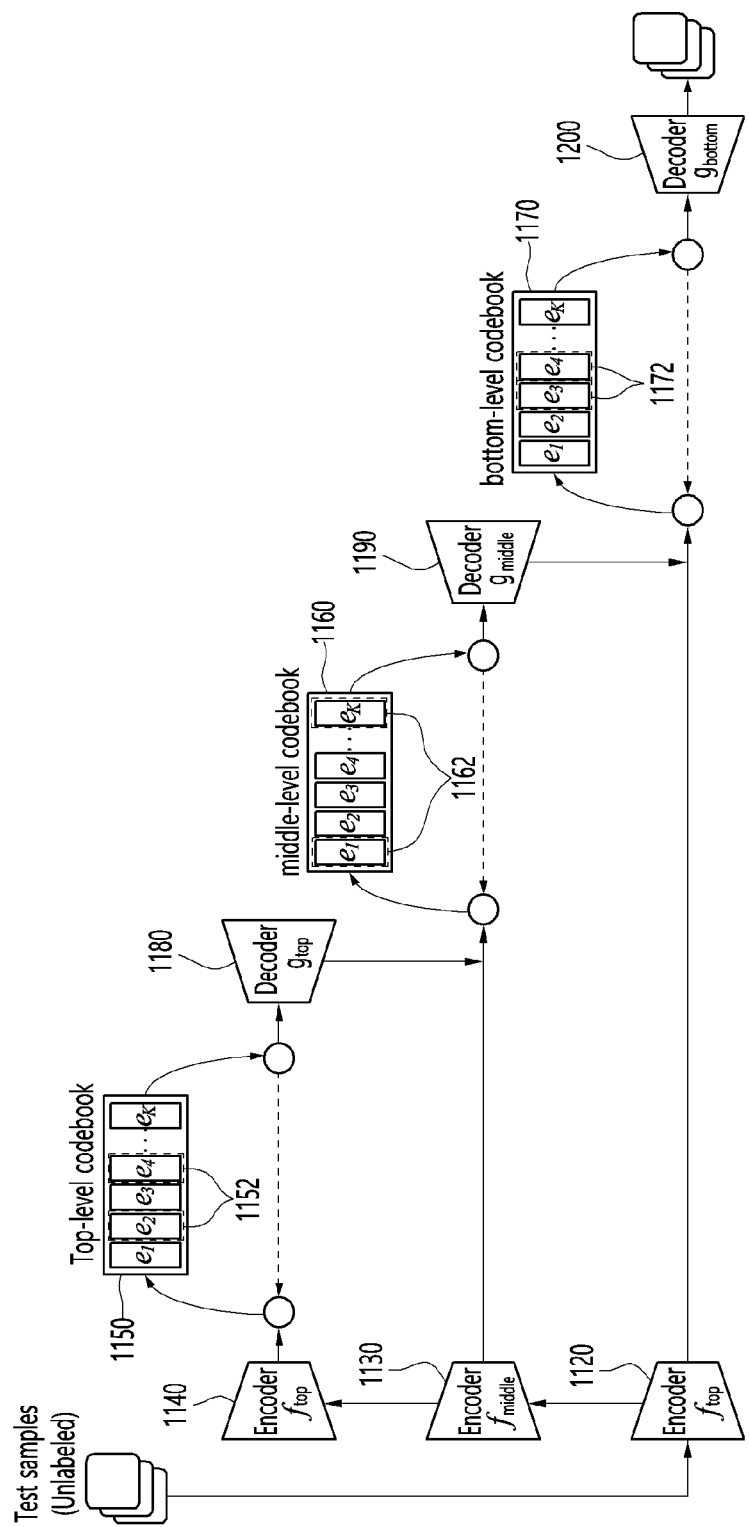
FIG. 11 is a diagram illustrating a first model for explaining an artificial intelligence apparatus according to another embodiment of the present disclosure.

FIG. 11 is a diagram illustrating a first model for explaining an artificial intelligence apparatus according to another embodiment of the present disclosure.

In other words, FIG. 11 is a diagram illustrating a process of classifying an item class using a pre-learned first model of another embodiment, as another embodiment of the first model.

Since the first model of another embodiment of the present disclosure is similar to the first model of FIGS. 9 and 10, a description of the learning process will be omitted.

As illustrated in FIG. 11, the present disclosure may detect an unknown item by classifying a class of an item image using a pre-learned codebook for each item class.

The present disclosure, when an unlabeled item image is input, encoded data is generated by encoding the item image, may use a codebook of a plurality of codebooks in which encoded data for each item class is stored, corresponding to a pre-learned item class, decode the encoded data to generate the decoded data, and thus classify a class of an item image based on the generated decoded data to detect an unknown item of an unseen class.

As illustrated in FIG. 11, when an item image is input, the first encoder 1120 may downsize the item image data to a first size to output first encoded data, the second encoder 1130 may downsize the first encoded data to the second size to output the second encoded data, and the third encoder 1140 may downsize the second encoded data to the third size to output the third encoded data.

Next, the first decoder 1180 may upsize the third encoded data to a third size based on the encoded data of the top-level codebook 1150 corresponding to the pre-learned item class to output the first decoded data.

Next, the second decoder 1190 may upsize the first decoded data and the second encoded data to a second size based on the encoded data of the middle-level codebook 1160 corresponding to the pre-learned item class to output a second decoded data.

Then, the third decoder 1200 may upsize the second decoded data and the first encoded data to a first size based on the encoded data of the bottom-level codebook 1170 corresponding to the pre-learned item class to output a third decoded data.

Here, the first encoder 1120 may replace the first encoded data with an index of a code latent vector of the code latent vectors in the bottom-level codebook 1170, having a minimum distance, the second encoder 1130 may replace the second encoded data with an index of a code latent vector of the code latent vectors in the middle-level codebook 1160, having a minimum distance, and the third encoder 1140 may replace the third encoded data with an index of the code latent vector of the code latent vectors in the top-level codebook 1150, having the minimum distance.

Then, the first decoder 1180 may map the index of the code latent vector corresponding to the third encoded data to the code latent vector 1152 of the top-level codebook 1150, respectively, the second decoder 1190 may map the indexes of the code latent vectors corresponding to the second encoded data to the code latent vectors 1162 of the middle-level codebook 1160, respectively, and the third decoder 1200 may map the indexes of the code latent vectors corresponding to the first encoded data to the code latent vector 1172 of the bottom-level codebook 1170, respectively.

Here, the index of the code latent vector may correspond to a partial image for each portion of the inputted item image.

Figure 12:
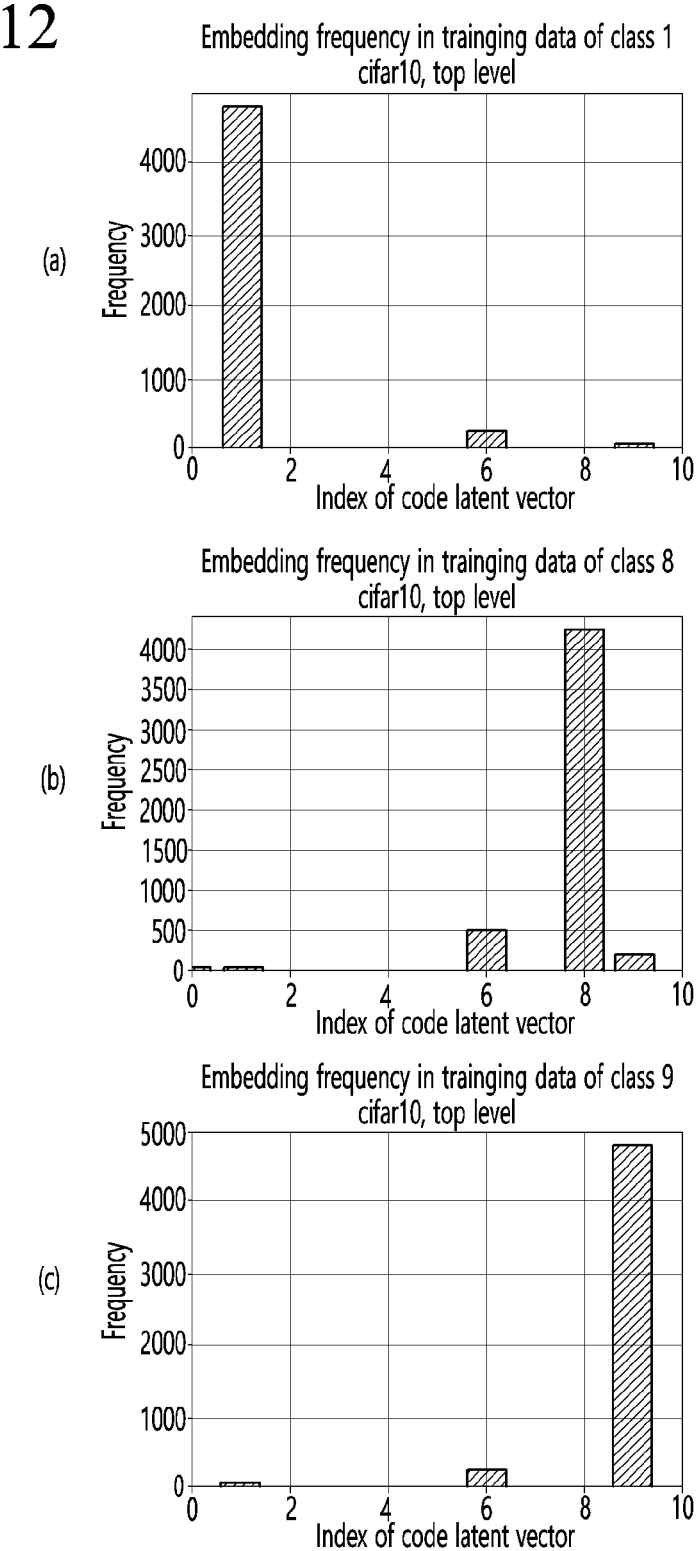
FIG. 12 is a diagram illustrating an embedding frequency in learning data for each item class.

FIG. 12 is a diagram illustrating an embedding frequency in learning data for each item class, wherein FIG. 12 (a) is a diagram illustrating the embedding frequency in the learning data of the first item class, FIG. 12 (b) is a diagram illustrating the embedding frequency in the training data of the eighth item class, and FIG. 12 (c) is a diagram illustrating the embedding frequency in the training data of the ninth item class.

Figure 13:
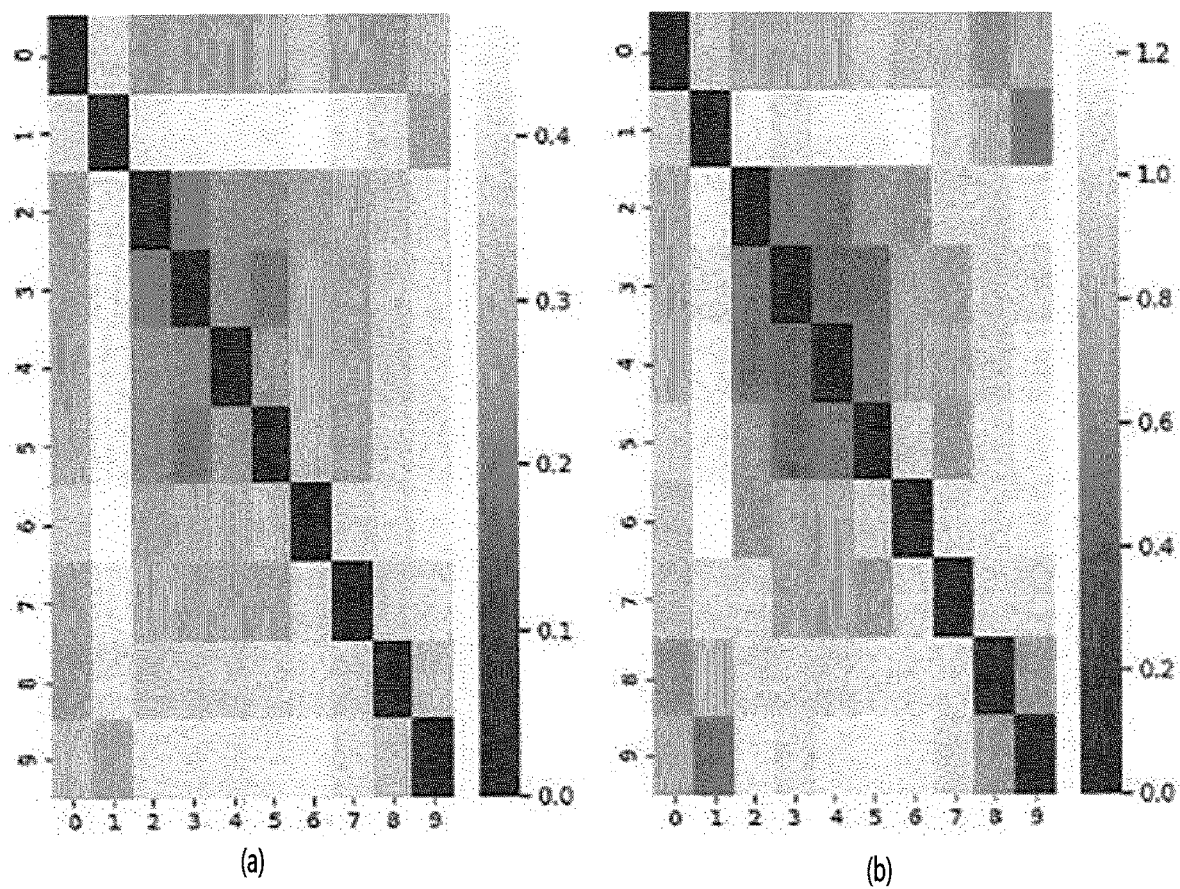
FIG. 13 is a diagram illustrating a heat map for a distance between embeddings.

FIG. 13 is a diagram illustrating a heat map for a distance between embeddings, wherein 13 (a) is a diagram illustrating a heat map for a distance between embeddings corresponding to the top-level, and FIG. 13 (b) is a diagram illustrating a heat map for the distance between embeddings corresponding to the bottom-level.

As illustrated in FIGS. 12 and 13, it can be seen that indexes of frequently used code latent vectors are different for each item class.

In other words, it can be seen that the present disclosure most uses a code latent vector corresponding to itself for each item class.

Accordingly, the present disclosure may classify an item class by using a code latent vector of code latent vectors in a codebook for each item class, having a minimum distance.

As such, the present disclosure may learn a plurality of codebooks so that encoded data for each item class is stored, reconstruct an item image using a codebook for each item class, and perform learning to classify the class of the reconstructed item image.

Here, the present disclosure may learn all of the codebooks for each layered characteristic level included in the codebook of each item class.

Figure 14:
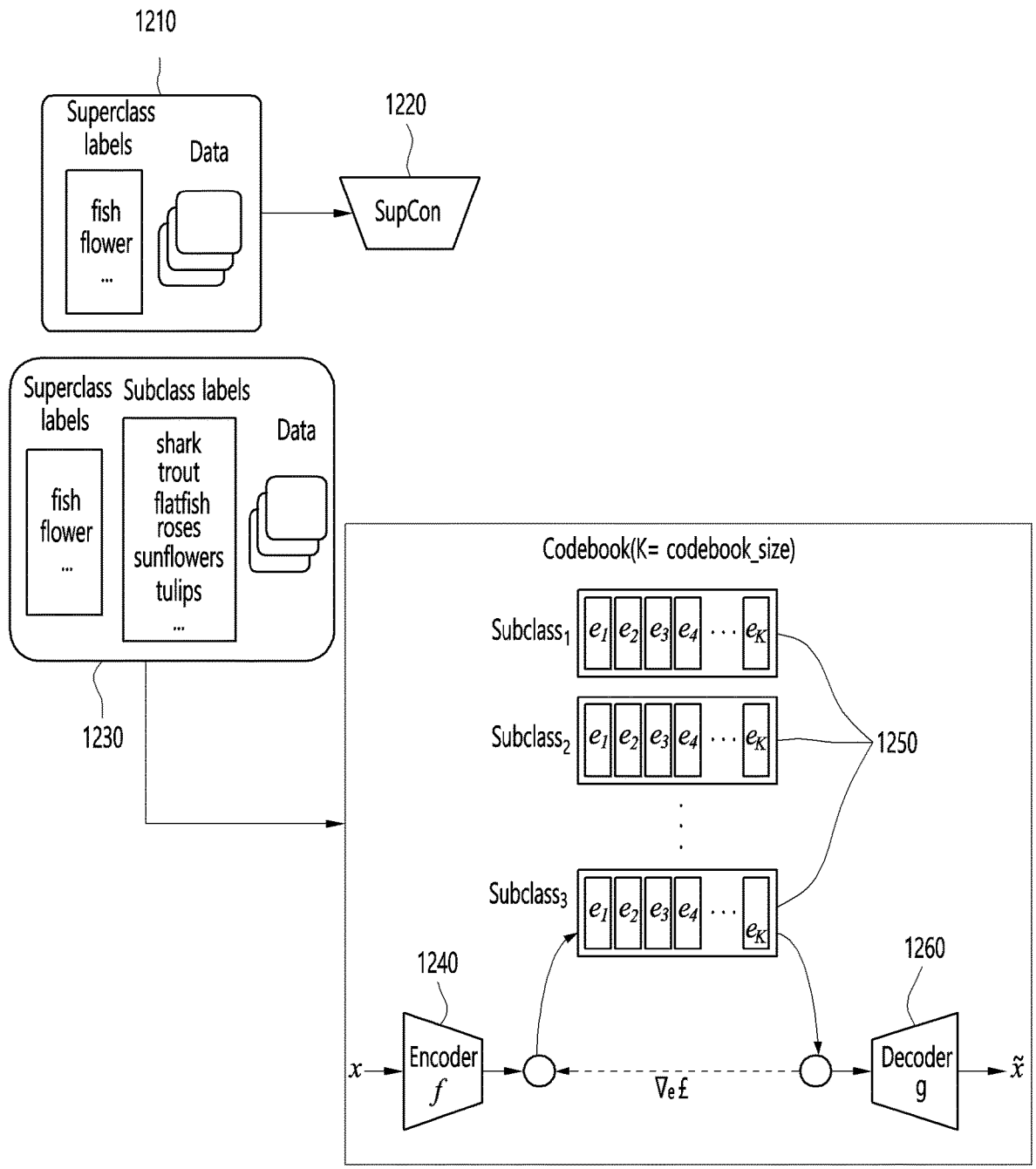
FIGS. 14 and 15 are diagrams illustrating a second model for explaining an artificial intelligence apparatus according to an embodiment of the present disclosure.
Figure 15:
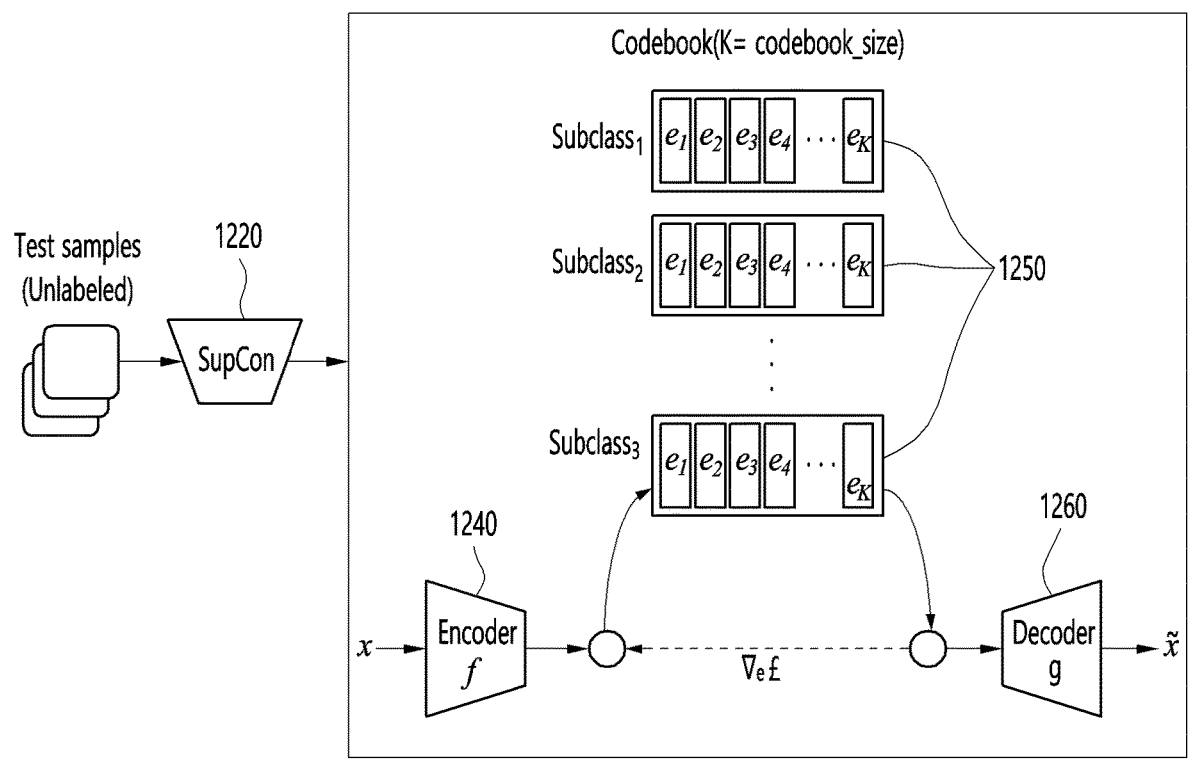

FIGS. 14 and 15 are diagrams illustrating a second model for explaining an artificial intelligence apparatus according to an embodiment of the present disclosure.

FIG. 14 is a diagram illustrating a process of learning the second model, and FIG. 15 is a diagram illustrating a process of classifying an item class using the pre-learned second model.

As illustrated in FIG. 14, the present disclosure may first classify an item image into a superclass, and perform learning of item image data to secondarily classify the item image using codebooks for each subclass corresponding to the first classified superclass.

The present disclosure may perform learning to classify a superclass of an item image based on a training dataset 1210 including item image data and corresponding superclass label data.

In addition, the present disclosure may learn a plurality of codebooks so that encoded data for each subclass of each superclass is stored based on a training dataset 1230 including item image data, the corresponding superclass label data, and subclass label data, construct an item image using a codebook for each subclass, and perform learning to classify a class of a reconstructed item image.

Here, the present disclosure, when learning a plurality of codebooks, may learn all codebooks for each subclass included in each superclass.

In this case, the superclass label data may include label data having a larger category than the category corresponding to the subclass label data.

As an example, superclass label data may include fish, flowers, or the like, and subclass label data may include shark, trout, flatfish, rose, sunflower, tulip, or the like, but this is only an example and is not limited thereto.

As illustrated in FIG. 14, when a training dataset 1210 including item image data and the corresponding superclass label data is input, the classifier 1220 may perform learning to classify the superclass of the item image.

As an example, the classifier 1220 may be a Supervised Contrastive Learning Classifier (SupCon), but this is only an example and is not limited thereto.

Then, when the training dataset 1230 including the item image data, the corresponding superclass label data, and subclass label data is input, the encoder 1240 encodes the item image corresponding to each superclass to store the encoded data in the codebook 1250 for each subclass of each superclass.

Next, the decoder 1260 may decode the encoded data based on the encoded data stored in the codebook 1250 for each subclass to output the decoded data.

In addition, as illustrated in FIG. 15, the present disclosure may detect an unknown item by classifying the class of the item image using the pre-learned codebook for each subclass of each superclass.

When an unlabeled item image is input, the classifier 1220 of the present disclosure may classify the item image into a pre-learned superclass.

Then, the encoder 1240 may output encoded data by encoding the classified superclass item image.

Next, the decoder 1260 may output the decoded data by decoding the encoded data based on the encoded data stored in the pre-learned subclass codebook 1250 of each superclass.

The codebook of the present disclosure may include a plurality of subclass codebooks 1250 corresponding to each superclass.

Then, the encoder 1240 may replace the encoded data with the index of the code latent vector of the code latent vectors in the subclass codebook 1250 corresponding to the superclass of the item image having the minimum distance.

Then, the decoder 1260 may map the index of the code latent vector corresponding to the encoded data to the code latent vector of the subclass codebook 1250 corresponding to the superclass of the item image, respectively.

Here, the index of the code latent vector may correspond to a partial image for each portion of the inputted item image.

Next, the number of codebooks may be determined in proportion to the number of superclasses.

As an example, the number of codebooks may be greater than the number of superclasses.

The reason is that codebooks for each subclass having a smaller category than that of the superclass are included in each superclass.

Figure 16:
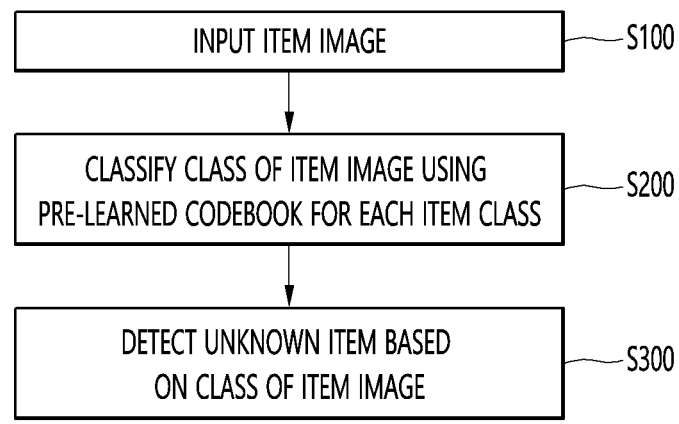
FIGS. 16 to 18 are flowcharts for explaining an unseen class item detection process of an artificial intelligence apparatus according to an embodiment of the present disclosure.
Figure 17:
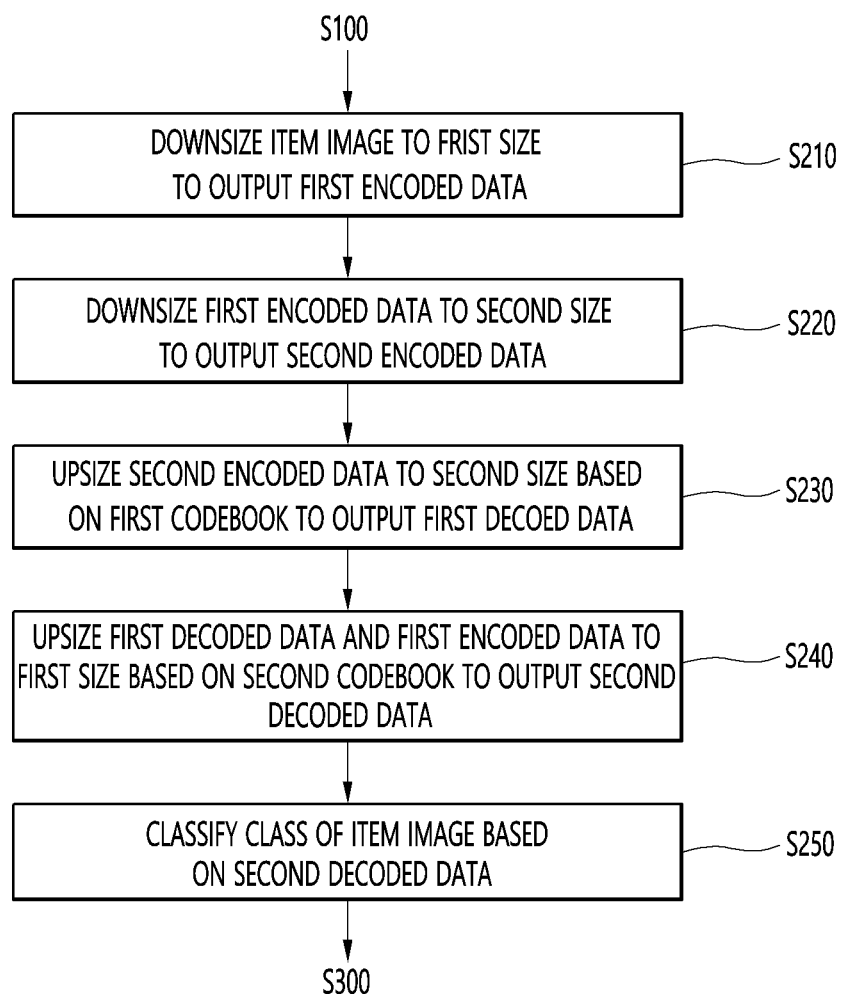
Figure 18:
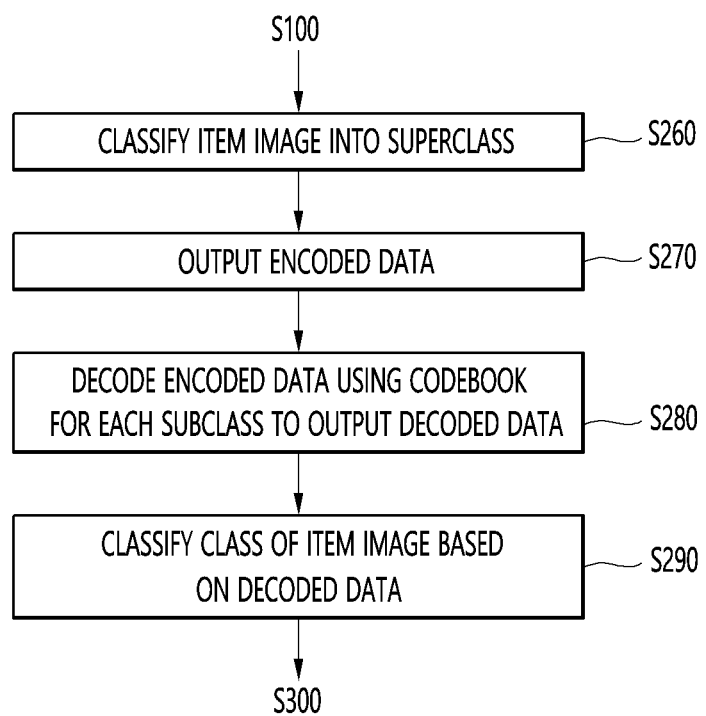

FIGS. 16 to 18 are flowcharts for explaining an unseen class item detection process of an artificial intelligence apparatus according to an embodiment of the present disclosure.

As illustrated in FIG. 16, the present disclosure may receive an item image (S100).

Next, the present disclosure may classify the class of the item image using a pre-learned codebook for each item class (S200).

Next, the present disclosure may detect an unknown item based on the class of the classified item image (S300).

Here, the step S200 of classifying the class of the item image may be performed in two ways.

The first method of FIG. 17 is a method for accurately identifying items with high similarity between classes by learning the codebooks for each layered characteristic level included in each item class according to the layered characteristic level so that local detailed information and global information of the item image are separated.

As illustrated in FIG. 17, the present disclosure may downsize the item image to a first size to output the first encoded data (S210).

Subsequently, the present disclosure may downsize the first encoded data to a second size to output the second encoded data (S220).

Next, the present disclosure may upsize the second encoded data to a second size based on the encoded data of the first codebook corresponding to the pre-learned item class to output the first decoded data (S230).

In addition, the present disclosure may upsize the first decoded data and the first encoded data to a first size based on the encoded data of the second codebook corresponding to the pre-learned item class to output the second decoded data (S240).

Next, the present disclosure may classify the class of the item image based on the second decoded data (S250).

Here, the first and second codebooks may constitute, as a set to which discrete data is mapped, an embedding space of a specified size, and the first codebook may include a bottom-level codebook corresponding to the first encoded data, and the second codebook may include a top-level codebook corresponding to the second encoded data.

In some cases, the present disclosure may classify a class of an item image as follows.

The present disclosure may downsize the item image to a first size to output the first encoded data.

Next, the present disclosure may downsize the first encoded data to a second size to output the second encoded data.

Next, the present disclosure may downsize the second encoded data to a third size to output the third encoded data.

In addition, the present disclosure may upsize the third encoded data to a third size based on the encoded data of the first codebook corresponding to the pre-learned item class to output the first decoded data.

Next, the present disclosure may upsize the first decoded data and the second encoded data to a second size based on the encoded data of the second codebook corresponding to the pre-learned item class to output the second decoded data.

Next, the present disclosure may upsize the second decoded data and the first encoded data to a first size based on the encoded data of the third codebook corresponding to the pre-learned item class to output the third decoded data.

In addition, the present disclosure may classify the class of the item image based on the third decoding data.

Here, the first, second, and third codebooks may constitute, as a set to which discrete data is mapped, an embedding space of a specified size, the first codebook may include a bottom-level codebook corresponding to the first encoded data, the second codebook may include a middle-level codebook corresponding to the second encoded data, and the third codebook may include a top-level codebook corresponding to the third encoded data.

The second method of FIG. 18 is a method of accurately classifying items having a high similarity between classes by learning a classifier to classify a superclass of an item image and learning codebooks for each subclass included in each superclass.

As illustrated in FIG. 18, the present disclosure, when an item image is input, may classify the item image into a pre-learned superclass (S260).

In addition, the present disclosure may output encoded data by encoding the classified superclass item image (S270).

Next, the present disclosure decodes the encoded data based on the encoded data stored in the codebook of a plurality of codebooks in which the encoded data is stored for each subclass of each superclass, corresponding to the pre-learned subclass, to output the decoded data (S280).

Next, the present disclosure may classify the class of the item image based on the output decoded data (S290).

Here, the codebook constitutes, as a set to which discrete data is mapped, an embedding space of a specified size, and may include a plurality of subclass codebooks corresponding to each superclass.

In this case, the codebook may include a plurality of codebooks for each superclass, and the plurality of codebooks included in each superclass may include codebooks for each subclass having a smaller category than that of the superclass.

FIG. 19 is a chart illustrating an unseen class detection performance result for a first model of an artificial intelligence apparatus according to an embodiment of the present disclosure.

FIG. 19 (a) is a chart comparing the unseen class detection performance of existing model and the first proposed model of the present disclosure (our proposition 1: our pro1) based on the In-Distribution (ID) dataset and the Out-Of-Distribution (OOD) dataset in the image data for each class, FIG. 19 (b) is a chart comparing the unseen class detection performance of the existing model and the first proposed model of the present disclosure (our pro1) based on the ID dataset and the OOD dataset in the pat image data, and FIG. 19 (c) is a chart comparing the unseen class detection performance of an existing model and the first proposed model of the present disclosure (our pro1) based on the ID dataset and the OOD dataset in Oxford flower image data.

Here, the existing models may include a Mahalanobis Distance with tied-covariance (MD) model, a Self-Supervised outlier Detection (SSD) model, a Relative Mahalanobis Distance (RMD) model, a Relative Mahalanobis Distance (RMD) model to which a Supervised Contrastive (SupCon) is added, and a Maximum Softmax Probability (MSP) model.

In addition, the first proposed model (our pro1) of the present disclosure is, as the model described with reference to FIGS. 9 to 11, a method of accurately classifying items with high similarity between classes by learning the layered codebooks for each characteristic level included in each item class according to the layered characteristic level so that the local detailed information and global information of the item image are separated.

As illustrated in FIG. 19(a), it can be seen that the first proposed model (our pro1) of the present disclosure is an unseen class detection performance index based on image data for each class, the Area Under a Receiver Operating Characteristic Curve (AUROC) for True Positive Rate (TPR) and False Positive Rate (FPR) is about 80% and False Positive Rate (FPR) is about 79%.

In addition, as illustrated in FIG. 19(b), it can be seen that the first proposed model (our pro1) of the present disclosure is an unseen class detection performance index based on pet image data, and AUROC for TPR and FPR is about 84%, and FPR is about 52%.

In addition, as illustrated in FIG. 19(c), it can be seen that the first proposed model (our pro1) of the present disclosure is an unseen class detection performance index based on Oxford flower image data, and AUROC for TPR and FPR is about 94%, FPR is about 46%.

Therefore, it can be seen that the first proposed model (our pro1) of the present disclosure has superior unseen class detection performance for image data compared to other existing models.

FIG. 20 is a diagram illustrating an unseen class detection performance result for a second model of an artificial intelligence apparatus according to an embodiment of the present disclosure.

FIG. 20 is a chart comparing the unseen class detection performance of an existing model and a second proposed model of the present disclosure (our proposition 2: our pro2) based on an In-Distribution (ID) dataset and an Out-Of-Distribution (OOD) dataset in image data for each class.

Here, the existing model may include a Maximum Softmax Probability (MSP) model, a Mahalanobis Distance with tied-covariance (MD) model, a Self-Supervised outlier Detection (SSD) model, and a Relative Mahalanobis Distance (RMD) model.

In addition, the second proposed model (our pro2) of the present disclosure is, as the model described in FIGS. 14 and 15, a method for accurately classifying items with high similarity between classes by learning a classifier to classify a superclass of an item image and learning codebooks for each subclass included in each superclass.

As illustrated in FIG. 20, it can be seen that the second proposed model (our pro2) of the present disclosure is an unseen class detection performance index based on image data for each class, AUROC for TPR and FPR is about 96%.

Accordingly, it can be seen that the second proposed model (our pro2) of the present disclosure has superior unseen class detection performance for image data compared to other existing models.

Figure 21:
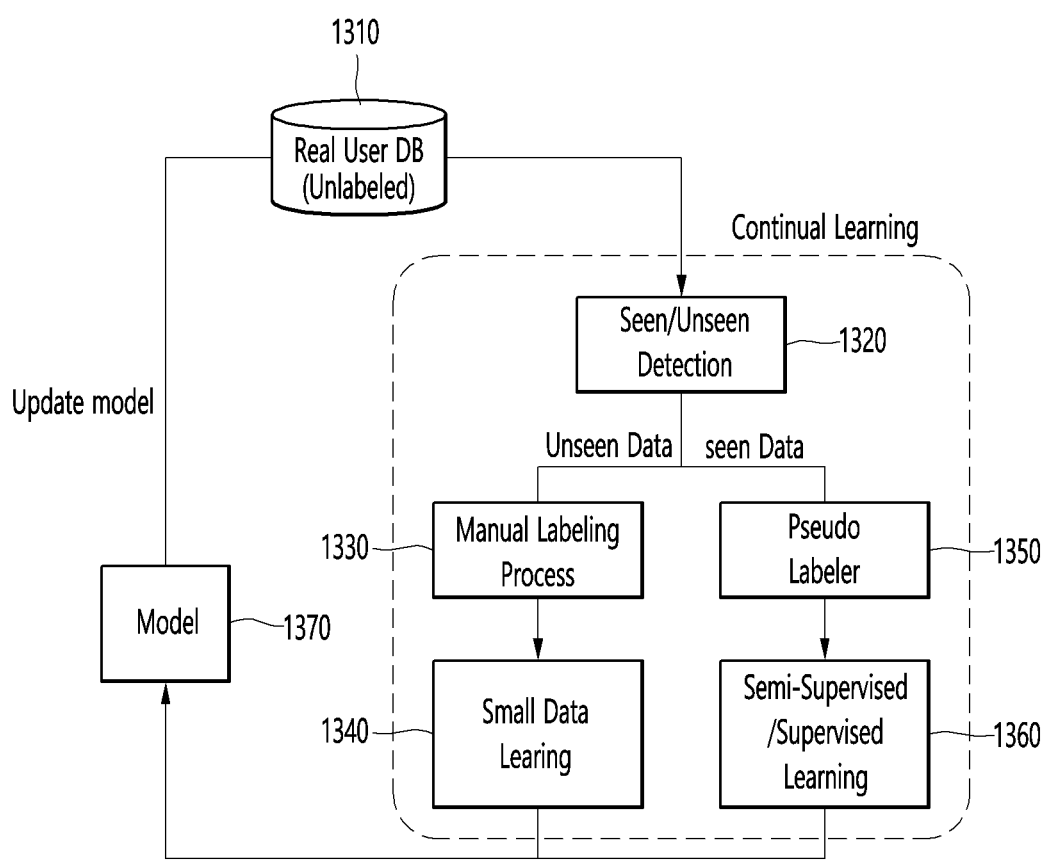
FIG. 21 is a diagram for explaining an overall operation flow of an artificial intelligence apparatus according to an embodiment of the present disclosure.

FIG. 21 is a diagram for explaining an overall operation flow of an artificial intelligence apparatus according to an embodiment of the present disclosure.

As illustrated in FIG. 21, when a specific item is put into various home appliances, stores the image data in a database 1310, the artificial intelligence apparatus of the present disclosure may perform a detection process 1320 which acquires image data of a specific item to be put thereinto, inputs unlabeled item image data stored in the database 1310 into the artificial intelligence model, and detects whether the item put into the home appliance is an item belonging to a seen class that has been pre-learned and known, or an item belonging to an unseen class that has not been learned and is not known.

In this detection process, the artificial intelligence apparatus of the present disclosure may provide a method for detecting a seen class and an unseen class based on the first proposed model described in FIGS. 9 to 11 and the second proposed model described in FIGS. 14 and 15.

Here, the first proposed model of the present disclosure is a method for accurately classifying items having high similarity between classes by learning the codebooks for each layered characteristic level included in each item class according to the layered characteristic level so that the local detailed information and global information of the item image are separated.

In addition, the second proposed model of the present disclosure is a method for accurately classifying items with high similarity between classes by learning a classifier to classify a superclass of an item image and learning codebooks for each subclass included in each superclass.

Next, the artificial intelligence apparatus of the present disclosure may perform a supervised learning and a semi-supervised learning process 1360 through a pseudo labeling process 1350 when the item image data is classified into a seen class.

Next, when the item image data is classified into an unseen class, the artificial intelligence apparatus of the present disclosure may perform a small data learning process 1340 through a manual labeling process 1330.

Next, the artificial intelligence apparatus of the present disclosure may perform a process 1370 of updating the model through such a learning process.

Figure 22:
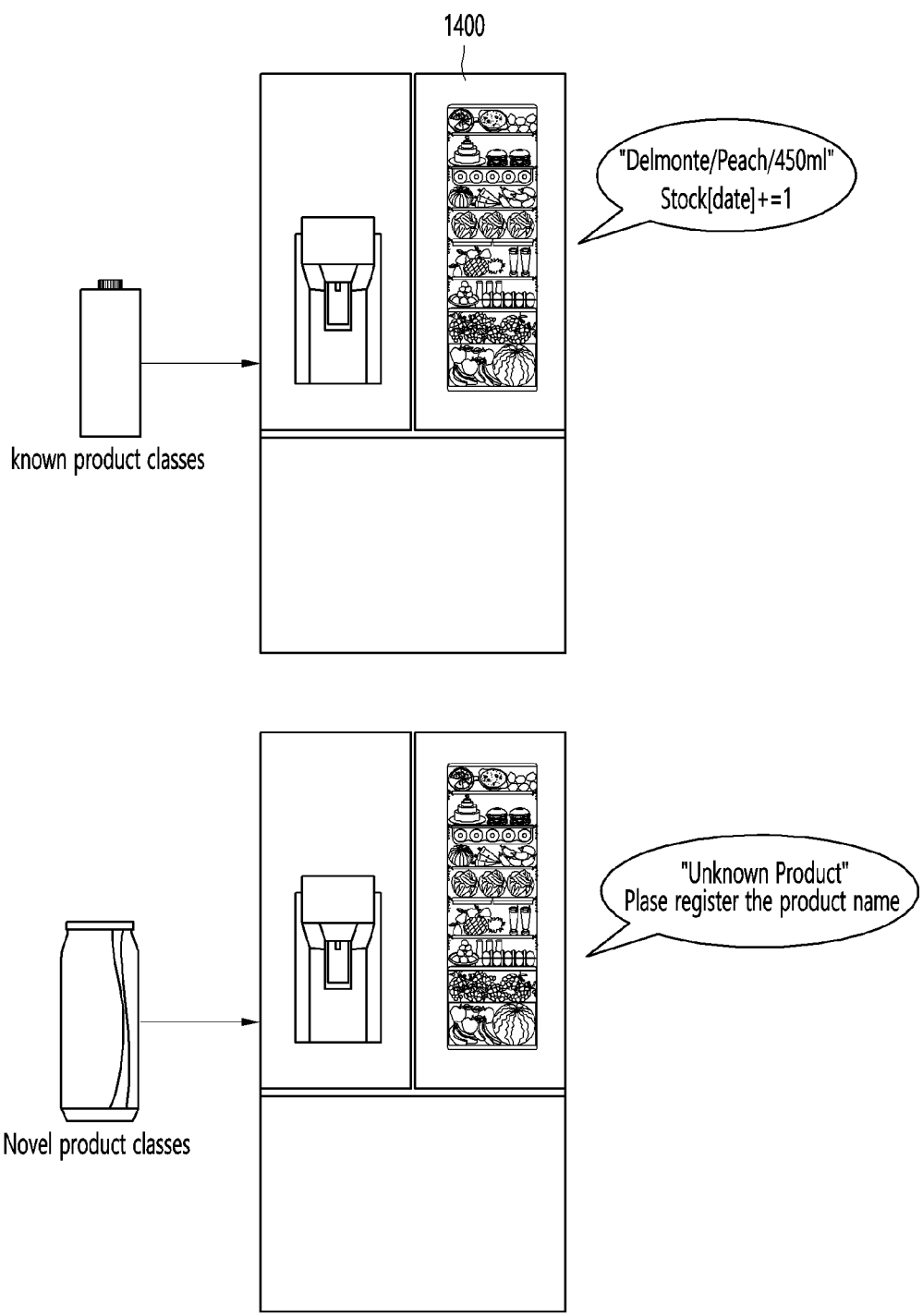
FIG. 22 is a view illustrating a refrigerator to which an artificial intelligence apparatus is applied according to an embodiment of the present disclosure.

FIG. 22 is a view illustrating a refrigerator to which an artificial intelligence apparatus is applied according to an embodiment of the present disclosure.

As illustrated in FIG. 22, the refrigerator to which the artificial intelligence apparatus of the present disclosure is applied acquires an image of the put item when a specific item is put thereinto, and inputs the acquired item image to the artificial intelligence model to detect the class of the item image.

Here, the refrigerator may output item information such as a product name, product type, product capacity, and receiving date corresponding to the item image, if the item image is a known item by being pre-learned.

For example, the refrigerator may provide the user with item information including a product name of Del Monte, a product type of peach flavor, and a product capacity of 450 ml.

Next, if the item image is a novel item, since it is an unknown item, the refrigerator may output a message requesting the user to register the product name.

For example, the refrigerator may provide a request message to the user, "This is an unknown product. Please register a product name."

Figure 23:
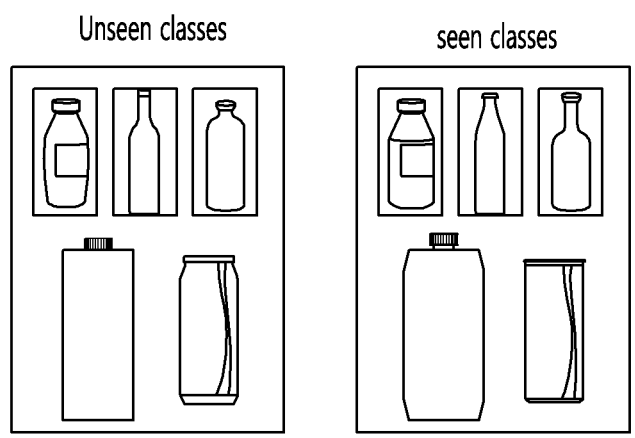
FIG. 23 is a diagram illustrating a seen class item and an unseen class item classified by a refrigerator to which an artificial intelligence apparatus is applied according to an embodiment of the present disclosure.

FIG. 23 is a diagram illustrating a seen class item and an unseen class item classified by a refrigerator to which an artificial intelligence apparatus is applied according to an embodiment of the present disclosure.

As illustrated in FIG. 23, the refrigerator to which the artificial intelligence apparatus of the present disclosure is applied accurately classifies unseen class items with high similarity to seen class items to improve the quality of services provided to customers.

As such, the artificial intelligence apparatus of the present disclosure learns the codebooks for each layered characteristic level included in each item class according to the layered characteristic level so that the local detailed information and global information of the item image are separated, so that the items having high similarity between classes can be classified accurately.

In some cases, the artificial intelligence apparatus of the present disclosure learns a classifier to classify a superclass of an item image, and learns codebooks for each subclass included in each superclass, thereby accurately classifying items with high similarity between classes.

The artificial intelligence apparatus of the present disclosure may selectively use an advantageous method according to the function of the applied electronic device and the characteristics of the product put to the electronic device among the two learning model methods.

Figure 24:
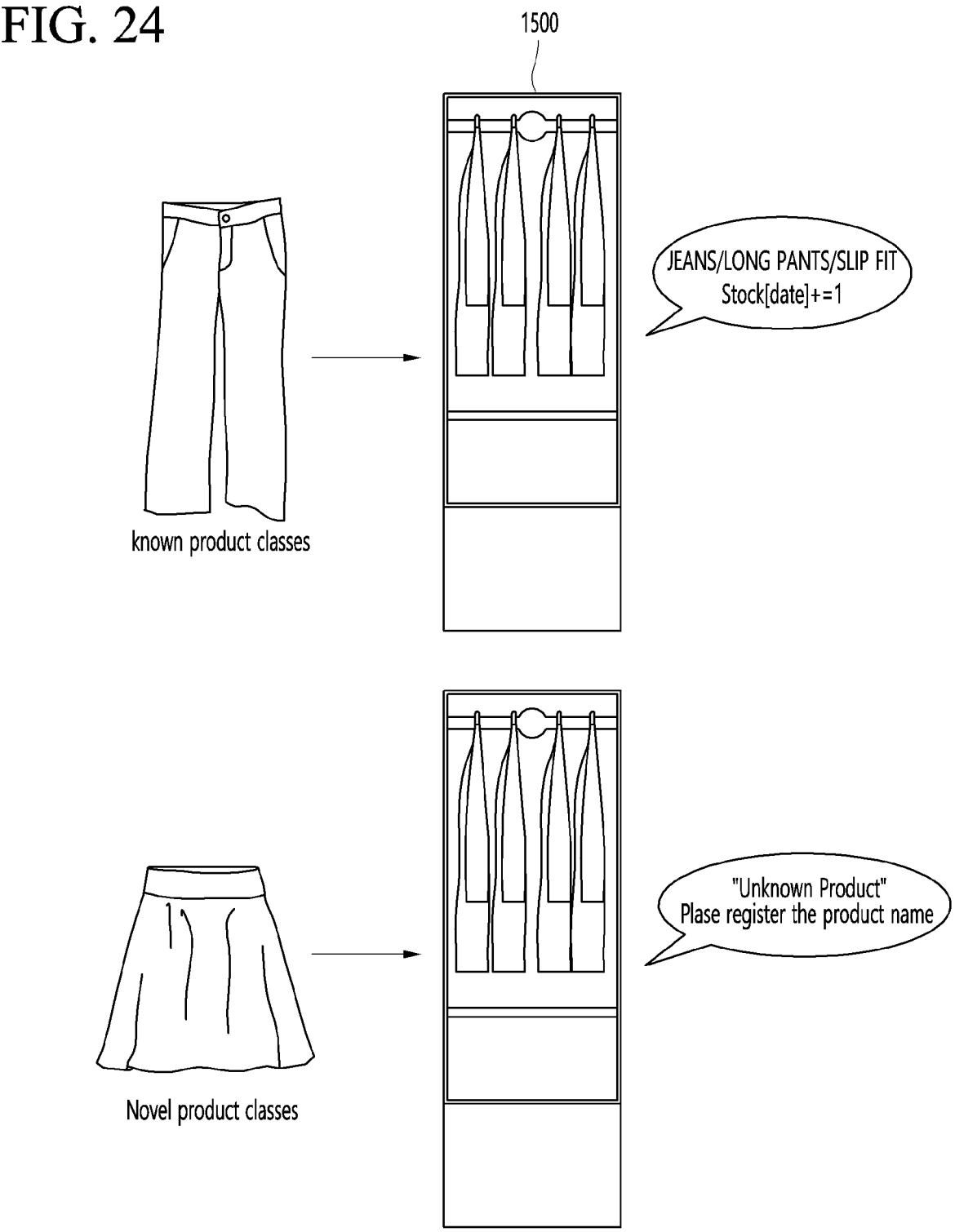
FIG. 24 is a diagram illustrating a clothing manager to which an artificial intelligence apparatus is applied according to an embodiment of the present disclosure.

FIG. 24 is a diagram illustrating a clothing manager to which an artificial intelligence apparatus is applied according to an embodiment of the present disclosure.

As illustrated in FIG. 24, the clothing manager to which the artificial intelligence apparatus of the present disclosure is applied acquires an image of the put clothing when specific clothing is put thereinto, and inputs the acquired clothing image to the artificial intelligence model to detect the class of the clothing image.

Here, if the clothing image is a known product by being pre-learned, the clothing manager may output product information such as a clothing name, clothing type, clothing characteristics, and receiving date corresponding thereto.

For example, the clothing manager may provide the user with clothing information including a clothing name of Levi's jeans, a clothing type of long pants, and clothing characteristic including a slip fit or the like.

Next, if the clothing image is a novel product, the clothing manager may output a message requesting the user to register the product name because it is an unknown item.

For example, the clothing manager may provide a request message to the user, "This is an unknown product. Please register a product name."

FIG. 25 is a view illustrating a washing machine to which an artificial intelligence apparatus is applied according to an embodiment of the present disclosure.

As illustrated in FIG. 25, the washing machine to which the artificial intelligence apparatus of the present disclosure is applied acquires an image of the put laundry when the laundry is put thereinto, and inputs the acquired laundry image to the artificial intelligence model to detect the class of the laundry image.

Here, if the laundry image is a known product by being pre-learned, the washing machine may output product information such as the laundry name, laundry type, and receiving date corresponding thereto.

For example, the washing machine may provide the user with product information including a sweater as a laundry name, silk as a laundry type, or the like.

Next, if the laundry image is a novel product, since it is an unknown product, the washing machine may output a message requesting to the user to register the product name.

For example, the washing machine may provide a request message to the user, "This is an unknown product. Please register a product name."

As described above, the artificial intelligence apparatus of the present disclosure classifies the class of the item by using the pre-learned codebook for each item class, so that items with high similarity between classes and items with data noise are accurately classified and can improve the quality of service provided to customers.

The present disclosure described above may be implemented as computer-readable code on a medium in which a program is recorded. The computer-readable medium includes all types of recording devices in which data readable by a computer system is stored. Examples of computer-readable media include Hard Disk Drive (HDD), Solid State Disk (SSD), Silicon Disk Drive (SDD), ROM, RAM, CD-ROM, magnetic tape, floppy disk, optical data storage device, or the like. In addition, the computer may include the processor 180 of the artificial intelligence apparatus.

What is claimed is:

1. An artificial intelligence apparatus comprising:
a memory; and
a processor configured to detect that an item is unknown by classifying an image of the item,
wherein the processor is further configured to:
based on input of the image of the item, generate encoded data by encoding the image;
generate decoded data by decoding the encoded data using a first codebook of a plurality of codebooks, wherein each of the plurality of codebooks stores encoded data corresponding to a respective pre-learned item class of a plurality of pre-learned item classes; and
detect that the item is unknown by classifying the image of the item based on the generated decoded data,
wherein the processor includes:
a plurality of encoders for encoding the image of the item to generate the encoded data;
a plurality of decoders for decoding the generated encoded data based on the encoded data stored in the first codebook of the plurality of codebooks, to generate the decoded data, wherein the first codebook corresponds to a first pre-learned item class of the plurality of pre-learned item classes; and
a detector for classifying the image of the item based on the generated decoded data to detect that the item is unknown,
wherein the processor is further configured to:
perform learning based on the plurality of codebooks to store the encoded data corresponding to each item class in the respective codebook based on a training dataset including item image data and corresponding item class label data;
reconstruct the image of the item using each codebook of the plurality of codebooks; and
perform learning to classify the reconstructed image of the item.

2. The artificial intelligence apparatus of claim 1,
wherein the plurality of encoders include:
a first encoder for downsizing the image of the item from a first size to a second size to output first encoded data; and
a second encoder for downsizing the first encoded data from the second size to a third size to output second encoded data, and
wherein the plurality of decoders include:
a first decoder for upsizing the second encoded data to the second size based on the encoded data stored in the first codebook corresponding to the first pre-learned item class, to output first decoded data; and
a second decoder for upsizing the first decoded data and the first encoded data to the first size based on the encoded data stored in a second codebook of the plurality of codebooks to output second decoded data, wherein the second codebook corresponds to the first pre-learned item class.

3. The artificial intelligence apparatus of claim 2,
wherein the plurality of codebooks constitute, as a set to which discrete data is mapped, an embedding space of a specified size, and include a bottom-level codebook corresponding to the first encoded data and a top-level codebook corresponding to the second encoded data.

4. An artificial intelligence apparatus comprising:
a memory; and
a processor configured to detect that an item is unknown by classifying an image of the item,
wherein the processor is further configured to:
based on input of the image of the item, generate encoded data by encoding the image;
generate decoded data by decoding the encoded data using a first codebook of a plurality of codebooks, wherein each of the plurality of codebooks stores encoded data corresponding to a respective pre-learned item class of a plurality of pre-learned item classes; and
detect that the item is unknown by classifying the image of the item based on the generated decoded data,
wherein the first codebook corresponds to a first pre-learned item class of the plurality of pre-learned item classes, and
wherein the processor includes:
a classifier for classifying the image of the item into a pre-learned superclass corresponding to the first pre-learned item class based on the input of the image of the item;
an encoder for encoding the image of the item classified into the pre-learned superclass, to output the encoded data;
a decoder for decoding the output encoded data based on the encoded data stored in the first codebook of the plurality of codebooks, to output the decoded data; and
a detector for classifying the image of the item based on the output decoded data to detect that the item is unknown.

5. The artificial intelligence apparatus of claim 4, wherein the classifier performs learning to classify the image of the item with respect to superclass, based on a training dataset including item image data and corresponding superclass label data.

6. The artificial intelligence apparatus of claim 5, wherein the classifier classifies the image of the item into the pre-learned superclass corresponding to a category that is broader than a category corresponding to the first pre-learned item class.

7. The artificial intelligence apparatus of claim 4, wherein the plurality of codebooks construct, as a set to which discrete data is mapped, an embedding space of a specified size, and wherein the plurality of codebooks correspond to the pre-learned superclass.

8. The artificial intelligence apparatus of claim 4, wherein the plurality of codebooks include a subset of codebooks for each superclass of a plurality of superclasses, and
wherein the subset of codebooks for a superclass of the plurality of superclasses includes codebooks for pre-learned item classes corresponding to the superclass, wherein a category of each of the pre-learned item classes is narrower than a category of the superclass.

9. The artificial intelligence apparatus of claim 4, wherein the processor is further configured to:
perform learning based on the plurality of codebooks to store the encoded data corresponding to each item class within a superclass in the respective codebook based on a training dataset including item image data, corresponding superclass label data, and item class label data;
reconstruct the image of the item using each codebook of the plurality of codebooks; and
perform learning to classify the reconstructed image of the item.

10. The artificial intelligence apparatus of claim 9, wherein the superclass label data includes
label data corresponding to a category broader than a category corresponding to the item class label data.

11. A method for detecting that an item is unknown, at an artificial intelligence apparatus, the method comprising:
receiving an image of the item;
classifying the image of the item into an item class; and
detecting that the item is unknown based on the item class of the classified image,
wherein classifying the image of the item includes:
encoding the image of the item to generate encoded data;
generating decoded data by decoding the encoded data using a first codebook of a plurality of codebooks, wherein each of the plurality of codebooks stores encoded data corresponding to a respective pre-learned item class of a plurality of pre-learned item classes; and
classifying the image of the item based on the generated decoded data, and
wherein the method further comprises:
performing learning based on the plurality of codebooks to store the encoded data corresponding to each item class in the respective codebook based on a training dataset including item image data and corresponding item class label data;
reconstructing the image of the item using each codebook of the plurality of codebooks; and
performing learning to classify the reconstructed image of the item.

12. The method of claim 11,
wherein the first codebook corresponds to a first pre-learned item class of the plurality of pre-learned item classes,
wherein the classifying the image of the item further includes:
downsizing the image of the item from a first size to a second size to output first encoded data;
downsizing the first encoded data from the second size to a third size to output second encoded data;
upsizing the second encoded data to the second size based on the encoded data stored in the first codebook to output first decoded data;
upsizing the first decoded data and the first encoded data to the first size based on the encoded data stored in a second codebook of the plurality of codebooks to output second decoded data, wherein the second codebook corresponds to the first pre-learned item class; and
classifying the image of the item based on the second decoded data.

13. The method of claim 11,
wherein the first codebook corresponds to a first pre-learned item class of the plurality of pre-learned item classes,
wherein classifying the image of the item further includes:
classifying the image of the item into a pre-learned superclass corresponding to the first pre-learned item class based on an input of the image of the item;
encoding the classified image of the item to output the encoded data;

decoding the output encoded data based on the encoded data stored in the first codebook of the plurality of codebooks, to output the decoded data; and classifying the image of the item based on the output decoded data.

\* \* \* \* \*